United States Patent
Kaplan et al.

(10) Patent No.: US 10,432,522 B2
(45) Date of Patent: *Oct. 1, 2019

(54) NETWORK PACKET FLOW CONTROLLER WITH EXTENDED SESSION MANAGEMENT

(71) Applicant: 128 Technology, Inc., Burlington, MA (US)

(72) Inventors: Hadriel S. Kaplan, Nashua, NH (US); Prashant Kumar, Andover, MA (US); Patrick Timmons, Newton, MA (US); Patrick J. MeLampy, Dunstable, MA (US)

(73) Assignee: 128 Technology, Inc., Burlington, MA (US)

( * ) Notice: Subject to any disclaimer, the term of this patent is extended or adjusted under 35 U.S.C. 154(b) by 64 days.

This patent is subject to a terminal disclaimer.

(21) Appl. No.: 15/700,676

(22) Filed: Sep. 11, 2017

(65) Prior Publication Data
US 2017/0373972 A1  Dec. 28, 2017

Related U.S. Application Data

(63) Continuation of application No. 14/833,571, filed on Aug. 24, 2015, now Pat. No. 9,762,485.

(51) Int. Cl.
*H04L 12/28* (2006.01)
*H04L 12/741* (2013.01)
(Continued)

(52) U.S. Cl.
CPC .............. *H04L 45/74* (2013.01); *H04L 45/38* (2013.01); *H04L 49/252* (2013.01); *H04L 49/30* (2013.01);
(Continued)

(58) Field of Classification Search
CPC combination set(s) only.
See application file for complete search history.

(56) References Cited

U.S. PATENT DOCUMENTS

| | | |
|---|---|---|
| 6,247,054 B1 | 6/2001 | Malkin |
| 6,515,963 B1 | 2/2003 | Bechtolsheim et al. |

(Continued)

FOREIGN PATENT DOCUMENTS

| | | |
|---|---|---|
| CN | 101552703 A | 10/2009 |
| CN | 101646220 A | 2/2010 |

(Continued)

OTHER PUBLICATIONS

Berners-Lee et al., *Uniform Resource Identifier (URI): Generic Syntax*, Network Working Group, Request for Comments 3986, The Internet Society, 61 pages, Jan. 2005.

(Continued)

*Primary Examiner* — Frank Duong
(74) *Attorney, Agent, or Firm* — Nutter McClennen & Fish LLP

(57) ABSTRACT

An intermediate node obtains a lead packet of a plurality of packets in a session having a unique session identifier, modifies the lead packet to identify at least the intermediate node and also to identify source and destination port numbers assigned by the intermediate node for a possible forward association, and then forwards the lead packet toward the destination node though an intermediate node electronic output interface to the IP network. The intermediate node also may receive, through an intermediate node electronic input interface in communication with the IP network, a backward message from a next node having a next node identifier. Both the intermediate node and the next node form an association between the intermediate node identifier, the next node identifier, and the source and destination port numbers assigned by the intermediate node. This association (Continued)

is part of a forward association for the intermediate node and is part of a return associate for the next node.

20 Claims, 28 Drawing Sheets

(51) Int. Cl.
*H04L 12/947* (2013.01)
*H04L 12/935* (2013.01)
*H04L 29/12* (2006.01)
*H04L 12/721* (2013.01)
*H04L 29/06* (2006.01)

(52) U.S. Cl.
CPC ...... *H04L 61/2007* (2013.01); *H04L 61/2521* (2013.01); *H04L 61/6063* (2013.01); *H04L 61/6068* (2013.01); *H04L 69/22* (2013.01)

(56) References Cited

U.S. PATENT DOCUMENTS

| | | | |
|---|---|---|---|
| 6,563,824 B1* | 5/2003 | Bhatia | H04L 29/12009 370/352 |
| 6,584,071 B1 | 6/2003 | Kodialam et al. | |
| 6,721,334 B1 | 4/2004 | Ketcham | |
| 6,738,387 B1 | 5/2004 | Lin et al. | |
| 6,778,531 B1 | 8/2004 | Kodialam et al. | |
| 6,798,743 B1 | 9/2004 | Ma et al. | |
| 7,020,143 B2 | 3/2006 | Zdan | |
| 7,035,214 B1 | 4/2006 | Seddigh et al. | |
| 7,106,739 B1 | 9/2006 | Beier | |
| 7,154,902 B1 | 12/2006 | Sikdar | |
| 7,218,632 B1 | 5/2007 | Bechtolsheim et al. | |
| 7,315,541 B1 | 1/2008 | Housel et al. | |
| 7,373,660 B1 | 5/2008 | Guichard et al. | |
| 7,466,703 B1 | 12/2008 | Arunachalam et al. | |
| 7,536,720 B2 | 5/2009 | Burdett et al. | |
| 7,634,805 B2* | 12/2009 | Aroya | H04L 63/0263 711/202 |
| 7,706,411 B2 | 4/2010 | Wakumoto et al. | |
| 7,730,301 B2 | 6/2010 | Correll et al. | |
| 7,773,611 B2 | 8/2010 | Booth, III et al. | |
| 7,872,973 B2 | 1/2011 | Sterne et al. | |
| 8,068,417 B1 | 11/2011 | Roberts | |
| 8,094,560 B2 | 1/2012 | Bagepalli et al. | |
| 8,139,479 B1 | 3/2012 | Raszuk | |
| RE44,119 E | 4/2013 | Wang et al. | |
| 8,437,248 B2 | 5/2013 | Li et al. | |
| 8,527,641 B2 | 9/2013 | Degaonkar et al. | |
| 8,570,893 B2 | 10/2013 | Guo et al. | |
| 8,584,199 B1 | 11/2013 | Chen et al. | |
| 8,634,428 B2 | 1/2014 | Le Pennec et al. | |
| 8,804,489 B2 | 8/2014 | Lu et al. | |
| 8,942,085 B1 | 1/2015 | Pani et al. | |
| 8,989,020 B2 | 3/2015 | So | |
| 9,059,920 B2 | 6/2015 | Ravindran et al. | |
| 9,160,652 B2 | 10/2015 | Taillon et al. | |
| 9,240,953 B2 | 1/2016 | Carlstrom | |
| 9,276,864 B1 | 3/2016 | Vincent | |
| 2001/0030649 A1 | 10/2001 | Mamiya et al. | |
| 2002/0044553 A1 | 4/2002 | Chakravorty | |
| 2002/0075883 A1 | 6/2002 | Dell et al. | |
| 2002/0150041 A1 | 10/2002 | Reinshmidt et al. | |
| 2002/0176363 A1 | 11/2002 | Durinovic-Johri et al. | |
| 2003/0198189 A1* | 10/2003 | Roberts | H04L 45/00 370/252 |
| 2003/0214938 A1 | 11/2003 | Jindal et al. | |
| 2004/0014467 A1 | 1/2004 | O'Neill et al. | |
| 2004/0088542 A1 | 5/2004 | Daude et al. | |
| 2004/0177274 A1 | 9/2004 | Aroya | |
| 2004/0264481 A1* | 12/2004 | Darling | H04L 29/06 370/401 |
| 2005/0036616 A1 | 2/2005 | Huang et al. | |
| 2005/0063307 A1 | 3/2005 | Samuels et al. | |
| 2005/0182932 A1 | 8/2005 | Wheeler | |
| 2005/0238022 A1 | 10/2005 | Panigrahy | |
| 2006/0045014 A1 | 3/2006 | Charzinski | |
| 2006/0176894 A1 | 8/2006 | Oh et al. | |
| 2007/0171825 A1 | 7/2007 | Roberts et al. | |
| 2007/0171826 A1 | 7/2007 | Roberts et al. | |
| 2008/0214175 A1 | 9/2008 | Papadoglou et al. | |
| 2009/0007021 A1 | 1/2009 | Hayton | |
| 2009/0059958 A1 | 3/2009 | Nakata | |
| 2010/0125898 A1 | 5/2010 | Dubuc et al. | |
| 2010/0191968 A1 | 7/2010 | Patil et al. | |
| 2011/0069714 A1 | 3/2011 | Le Pennec et al. | |
| 2012/0144061 A1 | 6/2012 | Song | |
| 2012/0236860 A1 | 9/2012 | Kompella et al. | |
| 2013/0227166 A1 | 8/2013 | Ravindran et al. | |
| 2013/0297824 A1 | 11/2013 | Lan et al. | |
| 2014/0040488 A1 | 2/2014 | Small et al. | |
| 2015/0188814 A1 | 7/2015 | Jain et al. | |
| 2015/0229618 A1 | 8/2015 | Wan et al. | |
| 2015/0381324 A1 | 12/2015 | Mirsky et al. | |
| 2016/0094444 A1 | 3/2016 | MeLampy et al. | |

FOREIGN PATENT DOCUMENTS

| | | |
|---|---|---|
| CN | 101068242 B | 4/2010 |
| CN | 102158371 A | 8/2011 |
| CN | 101640629 B | 8/2012 |
| CN | 102739507 A | 10/2012 |
| CN | 101207604 B | 3/2013 |
| CN | 102769679 B | 6/2015 |
| CN | 103179192 B | 11/2015 |
| CN | 105245469 A | 1/2016 |
| EP | 1 313 267 B1 | 12/2006 |
| KR | 10-2011-0062994 A | 6/2011 |
| WO | WO 2007/084707 A2 | 7/2007 |
| WO | WO 2007/084755 A2 | 7/2007 |
| WO | WO 2008/043230 A1 | 4/2008 |
| WO | WO 2015/131537 A1 | 9/2015 |

OTHER PUBLICATIONS

Bjorklund, *YANG—A Data Modeling Language for the Network Configuration Protocol (NETCONF)*, Internet Engineering Task Force (IETF), Request for Comments 6020, ISSN: 2070-1721, 173 pages, Oct. 2010.

Caida, *Observing routing asymmetry in Internet traffic*, (www.caida.org/research/traffic-analysis/asymmetry/1), 7 pages, dated Jul. 17, 2013.

Chiosi, et al, *Network Functions Virtualisation—Introductory White Paper*, Issue 1, at the "SDN and OpenFlow World Congress", Darmstadt-Germany, (http://portal.etsi.org/nfv/nfv_white_paper), 16 pages, dated Oct. 22, 2012.

Cisco Systems, *Parallel Express Forwarding on the Cisco 10000 Series*, (White Paper) Cisco Systems, 4 pages, printed Jun. 17, 2015.

Data Plane Development Kit, *Programmer's Guide*, Release 16.04.0, 216 pages, Apr. 12, 2016.

Davis, *Layer 3 Switches Explained*, Happy Router, 6 pages, dated Aug. 30, 2007.

Filsfils, et al., *Segment Routing Architecture*, Network Working Group, Draft, 28 pages, Oct. 21, 2013.

Hansson, et al., *A Unified Approach to Constrained Mapping and Routing on Network-on-Chip Architectures*, CODES+ISSS '05 Proceedings of the 3rd IEEE/ACM/IFIP International Conference on Hardware/Software Codesign and System Synthesis, 6 pages, Sep. 19-21, 2005.

Herbert, *xps: Transmit Packet Steering*, Eklektix, Inc., 11 pages, Oct. 26, 2010.

*Transmission Control Protocol (TCP) Parameters*, (www.iana.org/assignments/tcp-parameters/tcp-parameters.xhtm), 5 pages, dated Sep. 22, 2014.

Katz et al., *Bidirectional Forwarding Detection (BFD)*, Internet Engineering Task Force (IETF), Request for Comments 5880, ISSN: 2070-1721, Juniper Networks, 49 pages, Jun. 2010.

Klement, *1.2 Overview of a TCP communications session*, RPG IV Socket Tutorial (http://www.scottklement.com/rpg/socketut/overview), 2 pages, 2001.

(56) References Cited

OTHER PUBLICATIONS

Microsoft, *Introduction to Receive Side Scaling*, Developer Resources, https://msdn.microsoft.com/en-us/library/windows/hardware/ff556942(v=vs.85).aspx, 3 pages, Apr. 2014.
Microsoft, *RSS with a Single Hardware Receive Queue*, Developer Resources, https://msdn.microsoft.com/en-us/library/windows/hardware/ff570727(v=vs.85).aspx, 2 pages, Jan. 2015.
Microsoft, *RSS with Hardware Queuing*, Developer Resources, https://msdn.microsoft.com/en-us/library/windows/hardware/ff570728(v=vs.85).aspx, 2 pages, Jan. 2015.
Microsoft, *Non-RSS Receive Processing*, Developer Resources, https://msdn.microsoft.com/en-us/library/windows/hardware/ff568798(v=vs.85).aspx, 2 pages, Jan. 2015.
PC Magazine Encyclopedia, *Definition of TCP/IP abc's*, PC Magazine Encyclopedia (www.pcmag.com/encyclopedia/term/52615), 5 pages, 2005.
Previdi, et al., *IPv6 Segment Routing Header (SRH)*, Network Working Group, Draft, 24 pages, Jul. 3, 2014.
Roberts, *The Next Generation of IP—Flow Routing*, SSGRR 2003S International Conference, L'Aquila, Italy, 11 pages, Jul. 29, 2003.
Rouse, *What is routing table?* Posted by Margaret Rouse (http://searchnetworking.techtarget.com/definition/routing-table), 5 pages, Apr. 2007.
Shang, et al., *Making Better Use of All Those TCP ACK Packets*, Computer Science Department, Worcester Polytechnic Institute, 10 pages, 2005.
Shaw, *Multi-queue network interfaces with SMP on Linux*, Greenhost, https://greenhost.net/2013/04/10/multi-queue-network-interfaces-with-smp-on-linux/, 5 pages, Apr. 10, 2013.
Sollins, et al., *Functional Requirements for Uniform Resource Names*, Network Working Group, Request for Comments 1737, 7 pages, Dec. 1994.
Srinivasan, et al., *A Technique for Low Energy Mapping and Routing in Network-on-Chip Architectures*, ISLPED '05 Proceedings of the 2005 International Symposium on Low Power Electronics and Design, 6 pages, Aug. 8-10, 2005.
Wikipedia, *LAN switching*, 5 pages, dated Jun. 12, 2013.
Wikipedia, *Management information base*, 6 pages, dated Jul. 15, 2013.
Wikipedia, *Reverse path forwarding*, 3 pages, dated Jul. 31, 2013.
Wikipedia, *Equal-cost multi path routing*, 1 page, dated Sep. 12, 2013.
Wikipedia, *Transmission Control Protocol*, 18 pages, dated Sep. 16, 2013.
Wikipedia, *Software-defined networking*, 6 pages, dated Sep. 16, 2013.
Wikipedia, *Network socket*, 4 pages, dated Sep. 19, 2013.
Wikipedia, *Router (computing)*, 8 pages, dated Sep. 23, 2013.
Wikipedia, *Network address translation*, 11 pages, dated Sep. 24, 2013.
Wikipedia, *Open vSwitch*, 2 pages, dated Nov. 24, 2013.
Wikipedia, *Active queue management* https://en.wikipedia.org/wiki/Active_queue_management, 2 pages, Apr. 22, 2015.
Wikipedia, *Network interface controller*, https://en.wikipedia.org/wiki/Network_interface_controller, 5 pages, May 19, 2015.
International Searching Authority, International Search Report—International Application No. PCT/2015/044815, dated Dec. 6, 2015, together with the Written Opinion of the International Searching Authority, 8 pages.
International Searching Authority, International Search Report—International Application No. PCT/US2015/060840, dated Mar. 8, 2016, together with the Written Opinion of the International Searching Authority, 13 pages.
International Searching Authority, International Search Report—International Application No. PCT/US2016/013416, dated Jun. 8, 2016, together with the Written Opinion of the International Searching Authority, 12 pages.
International Searching Authority, International Search Report—Application No. PCT/US2016/026938, dated Jul. 28, 2016, together with the Written Opinion of the International Searching Authority, 9 pages.
International Searching Authority, International Search Report—Application No. PCT/US2016/047988, dated Dec. 6, 2016, together with the Written Opinion of the International Searching Authority, 11 pages.
European Patent Office, Communication pursuant to Rules 70(2) and 70a(2) EPC—Application No. 16839931.9, dated Mar. 12, 2019, 5 pages.
Perkins, IP Encapsulation within IP, IETF RFC 2003, Oct. 1996, 15 pages.

\* cited by examiner

| Session | Source Port | Destination Port |
|---|---|---|
| 1 | 1 | 1 |
| 2 | 1 | 2 |
| 3 | 1 | 3 |
| ... | ... | ... |
| 65535 | 1 | 65535 |
| 65536 | 2 | 1 |
| 65537 | 2 | 2 |
| ... | ... | ... |

Fig. 13

Node A
- Session X
    - Return Association (RA)
        - SSA    1.1.1.1
        - SSP    10
        - SDA    5.5.5.5
        - SDP    20
        - SPR    100
    - Forward Association (FA)
        - SSA    2.2.2.2      (implicit)
        - SSP    30      (session source port assigned by Node A)
        - SDA    3.3.3.3      (next node address - Node B)
        - SDP    40      (session destination port assigned by Node A)
        - SPR    100
    - Flag = First Waypoint AIPR
- Session Y
    - RA
    - FA
    - Flag
- Session Z
    - RA
    - FA
    - Flag

*Fig. 15*

Node B

Session X

Return Association (RA)

SSA    2.2.2.2

SSP    30

SDA    3.3.3.3      (implicit)

SDP    40

SPR    100

Forward Association (FA)

SSA    3.3.3.3      (implicit)

SSP    50          (session source port assigned by Node B)

SDA    4.4.4.4      (next node address - Node C)

SDP    60          (session destination port assigned by Node B)

SPR    100

Flag = Intermediate Waypoint AIPR

Session Y

RA

FA

Flag

Session Z

RA

FA

Flag

*Fig. 16*

Node C
    Session X
        Return Association (RA)
            SSA   3.3.3.3
            SSP   50
            SDA   4.4.4.4      (implicit)
            SDP   60
            SPR   100
        Forward Association (FA)
            SSA   1.1.1.1      (original source address from metadata)
            SSP   10          (original source port from metadata)
            SDA   5.5.5.5      (original destination address from metadata)
            SDP   20          (original destination port from metadata)
            SPR   100
        Flag = Final Waypoint AIPR
    Session Y
        RA
        FA
        Flag
    Session Z
        RA
        FA
        Flag

*Fig. 17*

Node A

Lead Packet Information from Lead Packet (2201)

SSA    1.1.1.1

SSP    10

SDA    5.5.5.5

SDP    20

SPR    100

Lead Forward Association (when sending Modified Lead Packet 2202)

SSA    2.2.2.2       (implicit)

SSP    30           (assigned source port number sent in 2202)

SDP    40           (assigned destination port number sent in 2202)

Final Return Association (use SP and DP from Source as session ID)

SSA    1.1.1.1

SSP    10

SDA    5.5.5.5

SDP    20

Final Forward Association (use SSP and SDP assigned by Node A as session ID)

SSA    2.2.2.2       (implicit)

SSP    30

SDA    3.3.3.3       (after learning that Node B is next waypoint AIPR)

SDP    40

Flag = First Waypoint AIPR

*Fig. 23*

Node B

Lead Packet Information (from Modified Lead Packet 2202)

SSA    2.2.2.2

SSP    10

SDA    5.5.5.5

SDP    20

SPR    100

Lead Forward Association (when sending Modified Lead Packet 2203)

SSA    3.3.3.3       (implicit)

SSP    50           (assigned source port number sent in 2203)

SDP    60           (assigned destination port number sent in 2203)

Final Return Association (use SSP and SDP from Node A as session ID)

SSA    2.2.2.2

SSP    30

SDA    3.3.3.3       (implicit)

SDP    40

Final Forward Association (use SSP and SDP assigned by Node B as session ID)

SSA    3.3.3.3       (implicit)

SSP    50

SDA    4.4.4.4       (after learning that Node C is next waypoint AIPR)

SDP    60

Flag = Intermediate Waypoint AIPR

*Fig. 24*

Node C

Lead Packet Information (from Modified Lead Packet 2203)

SSA   3.3.3.3

SSP   10

SDA   5.5.5.5

SDP   20

SPR   100

Lead Forward Association (when sending Modified Lead Packet 2204)

SSA   4.4.4.4       (implicit)

SSP   70           (assigned source port number sent in 2204)

SDP   80           (assigned destination port number sent in 2204)

Final Return Association (use SSP and SDP from Node B as session ID)

SSA   3.3.3.3

SSP   50

SDA   4.4.4.4       (implicit)

SDP   60

Final Forward Association (use SP and DP from Source as session ID)

SSA   4.4.4.4       (implicit)

SSP   10

SDA   5.5.5.5       (after learning that Node C is final waypoint AIPR)

SDP   20

Flag = Final Waypoint AIPR

*Fig. 25*

NETWORK PACKET FLOW CONTROLLER WITH EXTENDED SESSION MANAGEMENT

RELATED APPLICATIONS

This patent application is a continuation of U.S. patent application Ser. No. 14/833,571 filed Aug. 24, 2015, entitled, "NETWORK PACKET FLOW CONTROLLER WITH EXTENDED SESSION MANAGEMENT,"and naming Kaplan, Kumar, Timmons, and MeLampy as inventors, the disclosure of which is incorporated herein, in its entirety, by reference.

This patent application is related to U.S. patent application Ser. No. 14/497,954 filed Sep. 26, 2014, entitled, "NETWORK PACKET FLOW CONTROLLER," and naming MeLampy, Baj, Kaplan, Kumar, Penfield, and Timmons as inventors, the disclosure of which is incorporated herein, in its entirety, by reference.

This patent application also is related to U.S. patent application Ser. No. 14/562,917, filed Dec. 8, 2014, entitled, "STATEFUL LOAD BALANCING IN A STATELESS NETWORK," and naming Timmons, Baj, Kaplan, MeLampy, Kumar, and Penfield as inventors, the disclosure of which is incorporated herein, in its entirety, by reference.

This patent application also is related to U.S. patent application Ser. No. 14/715,036, filed May 18, 2015, entitled, "NETWORK DEVICE AND METHOD FOR PROCESSING A SESSION USING A PACKET SIGNATURE," and naming Kumar, Timmons, and MeLampy as inventors, the disclosure of which is incorporated herein, in its entirety, by reference.

FIELD OF THE INVENTION

The present invention relates to data routing and, more particularly, to routing packets in an IP network.

BACKGROUND OF THE INVENTION

The Internet Protocol ("IP") serves as the de-facto standard for forwarding data messages ("datagrams") between network devices connected with the Internet. To that end, IP delivers datagrams across a series of Internet devices, such as routers and switches, in the form of one or more data packets. Each packet has two principal parts: (1) a payload with the information being conveyed (e.g., text, graphic, audio, or video data), and (2) a header, known as an "IP header," having the address of the network device to receive the packet(s) (the "destination device"), the identity of the network device that sent the packet (the "originating device"), and other data for routing the packet.

Many people thus analogize packets to a traditional letter using first class mail, where the letter functions as the payload, and the envelope, with its return and mailing addresses, functions as the IP header.

Current Internet devices forward packets one-by-one based essentially on the address of the destination device in the packet header. Among other benefits, this routing scheme enables network devices to forward different packets of a single datagram along different routes to reduce network congestion, or avoid malfunctioning network devices. Those skilled in the art thus refer to IP as a "stateless" protocol because, among other reasons, it does not save packet path data, and does not pre-arrange transmission of packets between end points.

While it has benefits, IP's statelessness introduces various limitations. For example, without modification, a stateless IP network inhibits or prevents: 1) user mobility in mobile networks, 2) session layer load balancing for packet traffic in the network, and 3) routing between private or overlapping networks. The art has responded to this problem by implementing tunneling protocols, which provide these functions. Specifically, tunneling protocols transport IP datagrams to a destination along a route that normally is different than the route the datagram would have taken if it had not used a tunneling protocol. While nominally accomplishing their goals, tunneling protocols undesirably introduce additional problems into the network. For example, tunneling requires additional overhead that can induce IP packet fragmentation, consequently introducing substantial network inefficiencies into a session. In addition, tunnels generally use more bandwidth than non-tunneled packets, and tunnel origination and termination requires additional CPU cycles per packet. Moreover, tunnel addresses must be provisioned in advance, reducing flexibility.

Other attempts to overcome problems introduced by statelessness suffer from similar deficiencies.

SUMMARY OF VARIOUS EMBODIMENTS

In accordance with one exemplary embodiment of the invention, a packet routing method for directing packets of a session from an originating node toward a destination node in an IP network involves an intermediate node obtaining a lead packet of a plurality of packets in a session, the intermediate node having an intermediate node identifier, the lead packet including a 5-tuple of information including an original protocol identifier, an original source address, an original source port number, an original destination address, and an original destination port number. The packet routing method further involves storing return association information in a memory based on the 5-tuple of information in the lead packet. The packet routing method further involves determining a next node for the session, assigning a source port number and a destination port number for the session, storing forward association information for the session including the next node identifier and the assigned source and destination port numbers; and modifying the lead packet to include the intermediate node identifier as the source address, the next node address as the destination address, the assigned session source and destination port numbers, and the original protocol identifier, and to include the original source address, the original source port number, the original destination address, and the original destination port number as metadata. The modified lead packet is forwarded to the next node though an intermediate node electronic output interface to the IP network, the electronic output interface being in communication with the IP network.

In accordance with another exemplary embodiment of the invention, an intermediate routing device is configured to direct packets of a session from an originating node toward a destination node in an IP network. The intermediate routing device includes a plurality of communication interfaces for sending and receiving IP packets over an IP network; a memory for storing session state information; a packet identifier operatively coupled with the plurality of communication interfaces, the packet identifier configured to identify a lead packet of a plurality of packets in a session received through a first communication interface, the lead packet including a 5-tuple of information including an original source address, an original source port number, an original destination address, and an original destination port number; a packet modifier operatively coupled with the packet identifier, the packet modifier being configured to (a)

store return association information in a memory, the return association information based on the 5-tuple of information in the lead packet; (b) determine a next node for the session, the next node having a next node identifier; (c) assign a source port number and a destination port number for the session; (d) store forward association information for the session, the forward association information including the next node identifier and the assigned source and destination port numbers; and (e) modify the lead packet to include the intermediate node identifier as the source address, the next node address as the destination address, the assigned session source and destination port numbers, and the original protocol identifier, and to include the original source address, the original source port number, the original destination address, and the original destination port number as metadata; and a router operatively coupled with the packet modifier and with the electronic output interface, the router being configured to forward the modified lead packet toward the destination node through a second communication interface.

In accordance with yet another exemplary embodiment of the invention, a computer program product comprises a tangible, non-transient computer usable medium encoded with instructions that when run on a computer system implement the packet routing method summarized above.

In any of the embodiments summarized above, the lead packet may be an original lead packet in which the original source address, the original source port number, the original destination address, and the original destination port number are received in header fields of the original lead packet. Alternatively, the lead packet may be a forwarded lead packet in which the original source address, the original source port number, the original destination address, and the original destination port number are received as metadata in the forwarded lead packet. The intermediate node may include a routing information base having routing information and next node information for the destination node based on the original destination address, and the next node for the session may be determined by accessing the routing information base. Subsequent packets of the session directed toward the destination node may be modified and forwarded based on the forward association information. Return packets of the session directed toward the originating node may be modified and forwarded based on the return association information. The modified lead packet may be addressed so that at least one network device receives the modified lead packet after it is forwarded and before the next node receives the lead packet. The intermediate node may include a routing device or a switching device.

Illustrative embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

FIG. 13 is a schematic representation of how source and destination port numbers can be associated with sessions for a given source (AIPR) network address, destination network address, and protocol identifier, in accordance with one exemplary embodiment.

FIG. 15 is a schematic diagram showing session-related data associated with a first AIPR based on the lead packet processing of FIG. 14.

FIG. 16 is a schematic diagram showing session-related data associated with an intermediate AIPR based on the lead packet processing of FIG. 14.

FIG. 17 is a schematic diagram showing session-related data associated with a final AIPR based on the lead packet processing of FIG. 14.

FIG. 23 is a schematic diagram showing session-related data associated with a first AIPR based on the lead packet processing of FIG. 22.

FIG. 24 is a schematic diagram showing session-related data associated with an intermediate AIPR based on the lead packet processing of FIG. 22.

FIG. 25 is a schematic diagram showing session-related data associated with a final AIPR based on the lead packet processing of FIG. 22.

DESCRIPTION OF ILLUSTRATIVE EMBODIMENTS

In accordance with preferred embodiments of the invention, a packet flow controller ensures that, at least for a flow in a forward direction, packets of a session follow the same path as the lead/first packet of that session, i.e., from a source device to a destination device. Details of various embodiments are discussed below.

Networks

Illustrative embodiments preferably are implemented on a conventional computer network. Among other things, a network includes at least two nodes and at least one link between the nodes. Nodes can include computing devices (sometimes referred to as hosts or devices) and routers. Computers may include personal computers, smart phones, television "cable boxes," automatic teller machines (ATMs) and many other types of equipment that include processors and network interfaces. Links include wired and wireless connections between pairs of nodes. In addition, nodes and/or links may be implemented completely in software, such as in a virtual machine, a software defined network, and using network function virtualization. Many networks include switches, which are largely transparent for purposes of this discussion. However, some switches also perform routing functions. For the present discussion, such routing switches are considered routers. Routers are described below.

Figure 1:
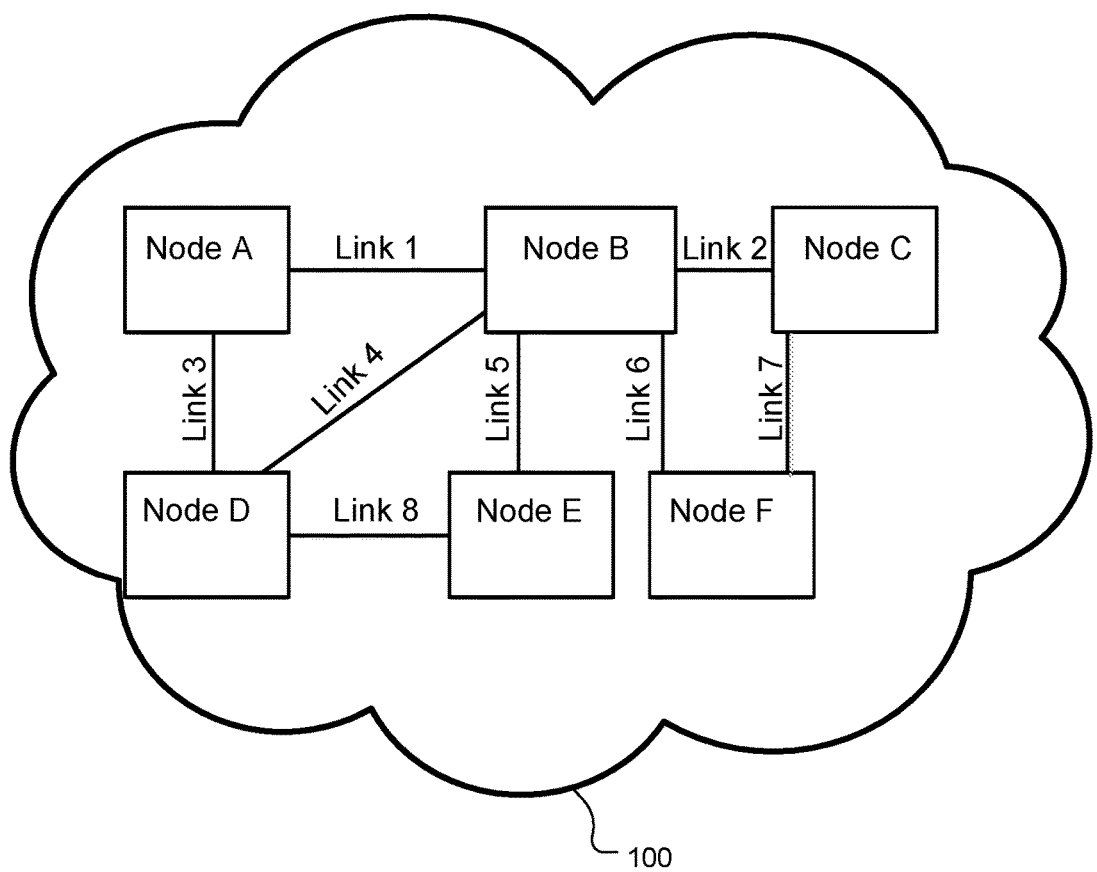
FIG. 1 is a schematic diagram of a hypothetical network, according to the prior art.

A node can be directly connected to one or more other nodes, each via a distinct link. For example, FIG. 1 schematically shows a Node A directly connected to Node B via Link 1. In a given network (e.g., within a local area network), each node has a unique network address to facilitate sending and receiving data. A network includes all the nodes addressable within the network according to the network's addressing scheme, and all the links that interconnect the nodes for communication according to the network's addressing scheme. For example, in FIG. 1, Node A, Node B, Node C . . . Node F and all the links 1-8 together make up a network 100. For simplicity, a network may be depicted as a cloud or as being enclosed within a cloud. Absence of a cloud, however, does not mean a collection of nodes and links are not a network. For example, a network may be formed by a plurality of smaller networks.

Nodes can initiate communications with other nodes via the network, and nodes can receive communications initiated by other nodes via the network. For example, a node may transmit/forward/send data (a message) to a directly connected (adjacent) node by sending the message via the link that interconnects the adjacent nodes. The message includes the network address of the sending node (the "source address") and the network address of the intended receiving node (the "destination address"). A sending node can send a message to a non-adjacent node via one or more other intervening nodes. For example, Node D may send a message to Node F via Node B. Using well known networking protocols, the node(s) between the source and the destination forward the message until the message reaches its destination. Accordingly, to operate properly, network protocols enable nodes to learn or discover network addresses of non-adjacent nodes in their network.

Nodes communicate via networks according to protocols, such as the well-known Internet Protocol (IP) and Transmission Control Protocol (TCP). The protocols are typically implemented by layered software and/or hardware components, such as according to the well-known seven-layer Open System Interconnect (OSI) model. As an example, IP operates at OSI Layer 3 (Network Layer), while the TCP operates largely at OSI Layer 4 (Transport Layer). Each layer performs a logical function and abstracts the layer below it, therefore hiding details of the lower layer.

Figure 2:
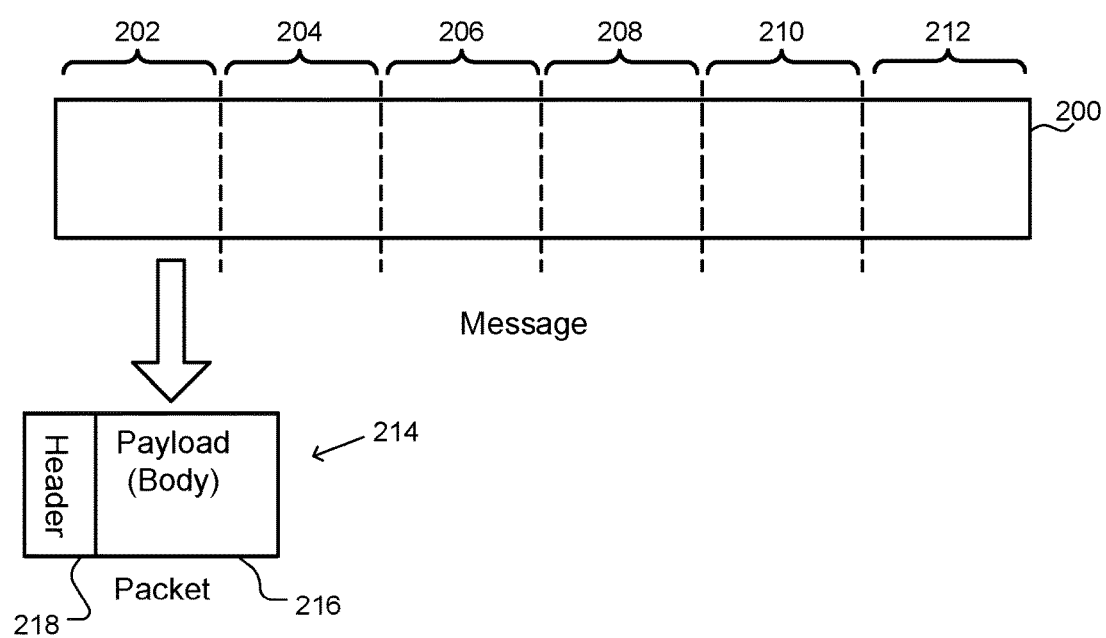
FIG. 2 is a schematic diagram illustrating fragmentation of a message, according to the prior art.

For example, Layer 3 may fragment a large message into smaller packets if Layer 2 (Data Link Layer) cannot handle the message as one transmission. FIG. 2 schematically illustrates a large message 200 divided into several pieces 202, 204, 206, 208, 210 and 212. Each piece 202-212 may then be sent in a separate packet, exemplified by packet 214. Each packet includes a payload (body) portion, exemplified by payload 216, and a header portion, exemplified at 218. The header portion 218 contains information, such as the packet's source address, destination address and packet sequence number, necessary or desirable for: 1) routing the packet to its destination, 2) reassembling the packets of a message, and 3) other functions provided according to the protocol. In some cases, a trailer portion is also appended to the payload, such as to carry a checksum of the payload or of the entire packet. All packets of a message need not be sent along the same path, i.e., through the same nodes, on their way to their common destination. It should be noted that although IP packets are officially called IP datagrams, they are commonly referred to simply as packets.

Some other protocols also fragment data into packets. For example, the TCP fragments data into segments, officially referred to as TCP protocol data units (PDUs). Nevertheless, in common usage, the term packet is used to refer to PDUs and datagrams, as well as Ethernet frames.

Most protocols encapsulate packets of higher level protocols. For example, IP encapsulates a TCP packet by adding an IP header to the TCP packet to produce an IP packet. Thus, packets sent at a lower layer can be thought of as being made up of packets within packets. Conventionally, a component operating according to a protocol examines or modifies only information within a header and/or trailer that was created by another component, typically within another node, operating according to the same protocol. That is, conventionally, components operating according to a protocol do not examine or modify portions of packets created by other protocols.

In another example of abstraction provided by layered protocols, some layers translate addresses. Some layers include layer-specific addressing schemes. For example, each end of a link is connected to a node via a real (e.g., electronic) or virtual interface, such as an Ethernet interface. At Layer 2 (Data Link Layer), each interface has an address, such as a media access control (MAC) address. On the other hand, at Layer 3 using IP, each interface, or at least each node, has an IP address. Layer 3 converts IP addresses to MAC addresses.

Figure 3:
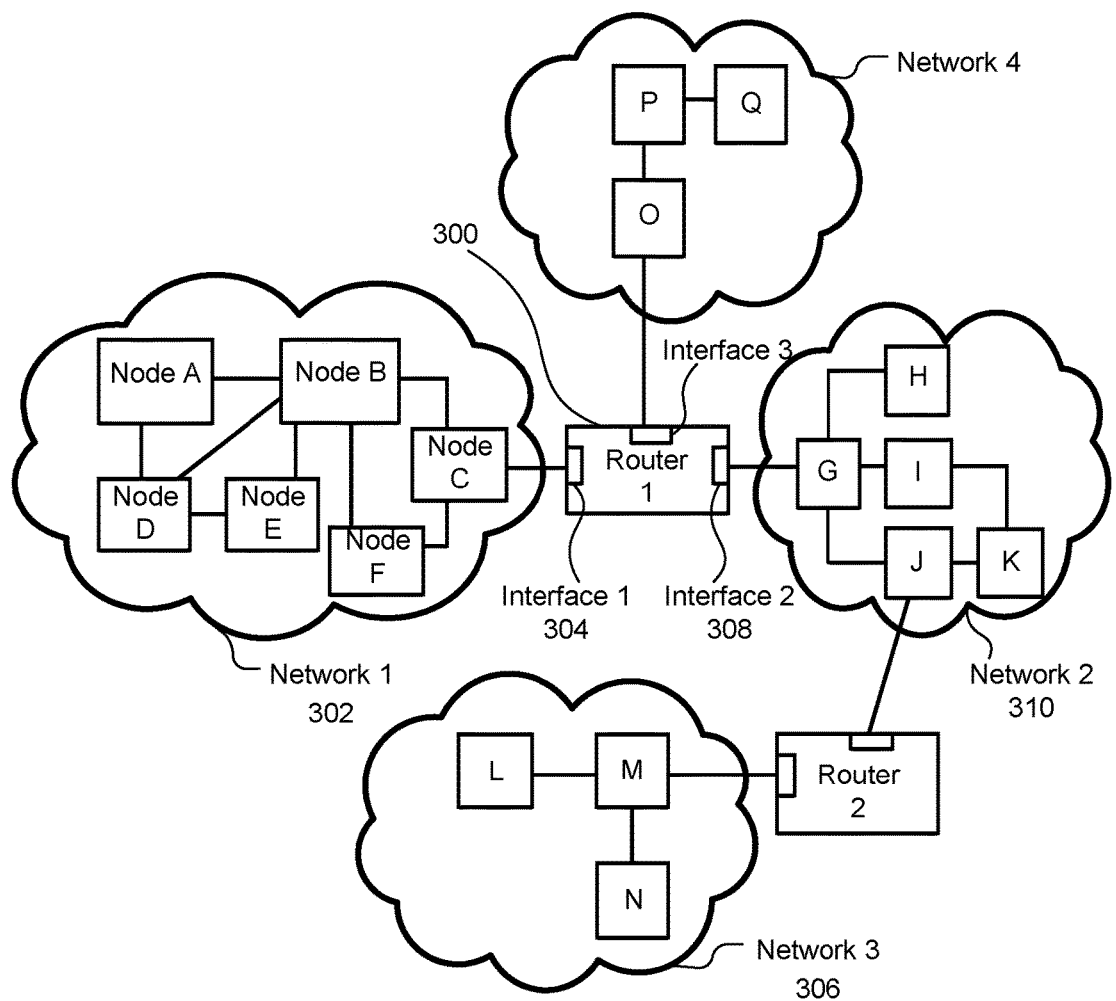
FIG. 3 is a schematic diagram of a hypothetical internet, according to the prior art.

A router typically acts as a node that interconnects two or more distinct networks or two or more sub-networks (subnets) of a single network, thereby creating a "network of networks" (i.e., an internet). Thus, a router has at least two interfaces, where each interface connects the router to a different network, as exemplified in FIG. 3. When a router receives a packet via one interface from one network, it uses information stored in its routing table to direct the packet to another network via another interface. The routing table contains network/next hop associations. These associations tell the router that a particular destination can optimally be reached by sending the packet to a specific router that represents a next hop on the way to the final destination. For example, if Router 1 300 receives a packet, via its Interface 1 304, from Network 1 302, and the packet is destined to a node in Network 3 306, the Router 1 300 consults its router table and then forwards the packet via its Interface 2 308 to Network 2 310. Network 2 310 will then forward the packet to Network 3 306. The next hop association can also be indicated in the routing table as an outgoing (exit) interface to the final destination.

Large organizations, such as large corporations, commercial data centers and telecommunications providers, often employ sets of routers in hierarchies to carry internal traffic. For example, one or more gateway routers may interconnect each organization's network to one or more Internet service providers (ISPs). ISPs also employ routers in hierarchies to carry traffic between their customers' gateways, to interconnect with other ISPs, and to interconnect with core routers in the Internet backbone.

A conventional router is considered a Layer 3 device because its primary forwarding decision is based on the information in the Layer 3 IP packet—specifically the destination IP address. A conventional router does not look into the actual data contents (i.e., the encapsulated payload) that the packet carries. Instead, the router only looks at the Layer 3 addresses to make a forwarding decision, plus optionally other information in the header for hints, such as quality of service (QoS) requirements. Once a packet is forwarded, a conventional router does not retain historical information about the packet, although the forwarding action may be collected to generate statistical data if the router is so configured.

Accordingly, an IP network is considered to be "stateless" because, among other things, it does not maintain this historical information. For example, an IP network generally treats each request as an independent transaction that is unrelated to any previous request. A router thus may route a packet regardless of how it processed a prior packet. As such, an IP network typically does not store session information or the status of incoming communications partners. For example, if a part of the network becomes disabled mid-transaction, there is no need to reallocate resources or otherwise fix the state of the network. Instead, packets may be routed along other nodes in the network. Illustrative embodiments, however, may include routers that statefully communicate, such as those described in the above referenced incorporated patent applications.

As noted, when a router receives a packet via one interface from one network, the router uses its routing table to direct the packet to another network. Table 1 lists information typically found in a basic IP routing table.

TABLE 1

| | |
|---|---|
| Destination | Partial IP address (Expressed as a bit-mask) or Complete IP address of a packet's final destination |
| Next hop | IP address to which the packet should be forwarded on its way to the final destination |
| Interface | Outgoing network interface to use to forward the packet |
| Cost/Metric | Cost of this path, relative to costs of other possible paths |
| Routes | Information about subnets, including how to reach subnets that are not directly attached to the router, via one or more hops; default routes to use for certain types of traffic or when information is lacking |

Routing tables may be filled in manually, such as by a system administrator, or dynamically by the router. The router uses routing protocols to exchange information with other routers and, thereby, dynamically learn about surrounding network or internet topology. For example, routers announce their presence in the network(s), more specifically, the range of IP addresses to which the routers can forward packets. Neighboring routers update their routing tables with this information and broadcast their ability to forward packets to the network(s) of the first router. This information eventually spreads to more distant routers in a network. Dynamic routing allows a router to respond to changes in a network or internet, such as increased network congestion, new routers joining an internet, and router or link failures.

A routing table therefore provides a set of rules for routing packets to their respective destinations. When a packet arrives, a router examines the packet's contents, such as its destination address, and finds the best matching rule in the routing table. The rule essentially tells the router which interface to use to forward the packet and the IP address of a node to which the packet is forwarded on its way to its final destination IP address.

With hop-by-hop routing, each routing table lists, for all reachable destinations, the address of the next node along a path to that destination, i.e., the next hop. Assuming that the routing tables are consistent, a simple algorithm of each router relaying packets to their destinations' respective next hop suffices to deliver packets anywhere in a network. Hop-by-hop is a fundamental characteristic of the IP Internetwork Layer and the OSI Network Layer.

Thus, each router's routing table typically merely contains information sufficient to forward a packet to another router that is "closer" to the packet's destination, without a guarantee of the packet ever being delivered to its destination. In a sense, a packet finds its way to its destination by visiting a series of routers and, at each router, using then-current rules to decide which router to visit next, with the hope that at least most packets ultimately reach their destinations.

Note that the rules may change between two successive hops of a packet or between two successive packets of a message, such as if a router becomes congested or a link fails. Two packets of a message may, therefore, follow different paths and even arrive out of order. In other words, when a packet is sent by a source or originating node, as a stateless network, there conventionally is no predetermined path the packet will take between the source node and the packet's destination. Instead, the path typically is dynamically determined as the packet traverses the various routers. This may be referred to as "natural routing," i.e., a path is determined dynamically as the packet traverses the internet.

Although natural routing has performed well for many years, natural routing has shortcomings. For example, because each packet of a session may travel along a different path and traverse a different set of routers, it is difficult to collect metrics for the session. Security functions that may be applicable to packets of the session must be widely distributed or risk not being applied to all the packets. Furthermore, attacks on the session may be mounted from many places.

It should be noted that conventionally, packets sent by the destination node back to the source node may follow different paths than the packets from the source node to the destination node.

In many situations, a client computer node ("client") establishes a session with a server computer node ("server"), and the client and server exchange packets within the session. For example, a client executing a browser may establish a session with a web server using a conventional process. The client may send one or more packets to request a web page, and the web server may respond with one or more packets containing contents of the web page. In some types of sessions, this back-and-forth exchange of packets may continue for several cycles. In some types of sessions, packets may be sent asynchronously between the two nodes. As discussed below, this handshake may be performed to provide a secure session over the Internet using well known protocols such as the Secure Sockets Layer Protocol ("SSL") or the Transport Layer Security Protocol ("TLS").

A session has its conventional meaning; namely, it is a plurality of packets sent by one node to another node, where all the packets are related, according to a protocol. A session may be thought of as including a lead (or initial) packet that begins the session, and one or more subsequent packets of the session. A session has a definite beginning and a definite end. For example, a TCP session is initiated by a SYN packet. In some cases, the end may be defined by a prescribed packet or series of packets. For example, a TCP session may be ended with a FIN exchange or an RST. In other cases, the end may be defined by lack of communication between the nodes for at least a predetermined amount of time (a timeout time). For example, a TCP session may be ended after a defined timeout period. Some sessions include only packets sent from one node to the other node. Other sessions include response packets, as in the web client/server interaction example. A session may include any number of cycles of back-and-forth communication, or asynchronous communication, according to the protocol, but all packets of a session are exchanged between the same client/server pair of nodes. A session is also referred to herein as a series of packets.

A computer having a single IP address may provide several services, such as web services, e-mail services and file transfer (FTP) services. Each service is typically assigned a port number in the range 0-65,535 that is unique on the computer. A service is, therefore, defined by a combination of the node's IP address and the service's port number. Note that this combination is unique within the network the computer is connected to, and it is often unique within an internet. Similarly, a single node may execute many clients. Therefore, a client that makes a request to a service is assigned a unique port number on the client's node, so return packets from the service can be uniquely addressed to the client that made the request.

The term socket means an IP address-port number combination. Thus, each service has a network-unique, and often internet-unique, service socket, and a client making a request of a service is assigned a network-unique, and sometimes internet-unique, client socket. In places, the terms source client and destination service are used when referring to a client that sends packets to make requests of a service and the service being requested, respectively.

Forward and Backward Flow Control

Illustrative embodiments of the present invention overcome these and other shortcomings by ensuring that subsequent packets of a session follow the same path as the lead packet of the session, at least in the forward direction, i.e., from the source client to the destination service. The subsequent packets traverse at least a subset of the routers the lead packet traverses between the source client and the destination service. Each router in the subset is referred to herein as an intermediate node or waypoint, although the waypoints are not necessarily predetermined before the lead packet is sent by the source client. The lead packet may be naturally routed. Nevertheless, the path taken by the lead packet establishes the waypoints, and the subsequent packets traverse the same waypoints, and in the same order, as the lead packet.

Of course, some packets may be dropped along the way, as is typical in an IP network or internet, such as by an overloaded router or due to corruption of the packet by a link. Thus, all the packets sent by the source client need not reach the session's destination service and, consequently, all the packets sent by the source client need not traverse all the waypoints. However, subsequent packets that do reach the destination service must traverse all the waypoints. For simplicity of explanation, dropped packets are ignored in the remaining discussion, and the term "all the packets" means all the packets that reach their respective destinations.

As a result of this forward flow control, metrics collected at one of the waypoints represent all the packets of the session. These metrics are not diluted by packets that bypass the waypoint, because no packet of the session can bypass any waypoint. Security functions, such as inspection for malicious packets, performed at one waypoint are sure to be performed on all the packets of the session.

Some embodiments of the present invention also ensure that return packets from the destination service to the source client also follow the same path, i.e., traverse the waypoints, but in reverse order. This reverse flow control enables use of paths, such as via proprietary networks, that might not otherwise be available by naturally routing the return packets.

Figure 4:
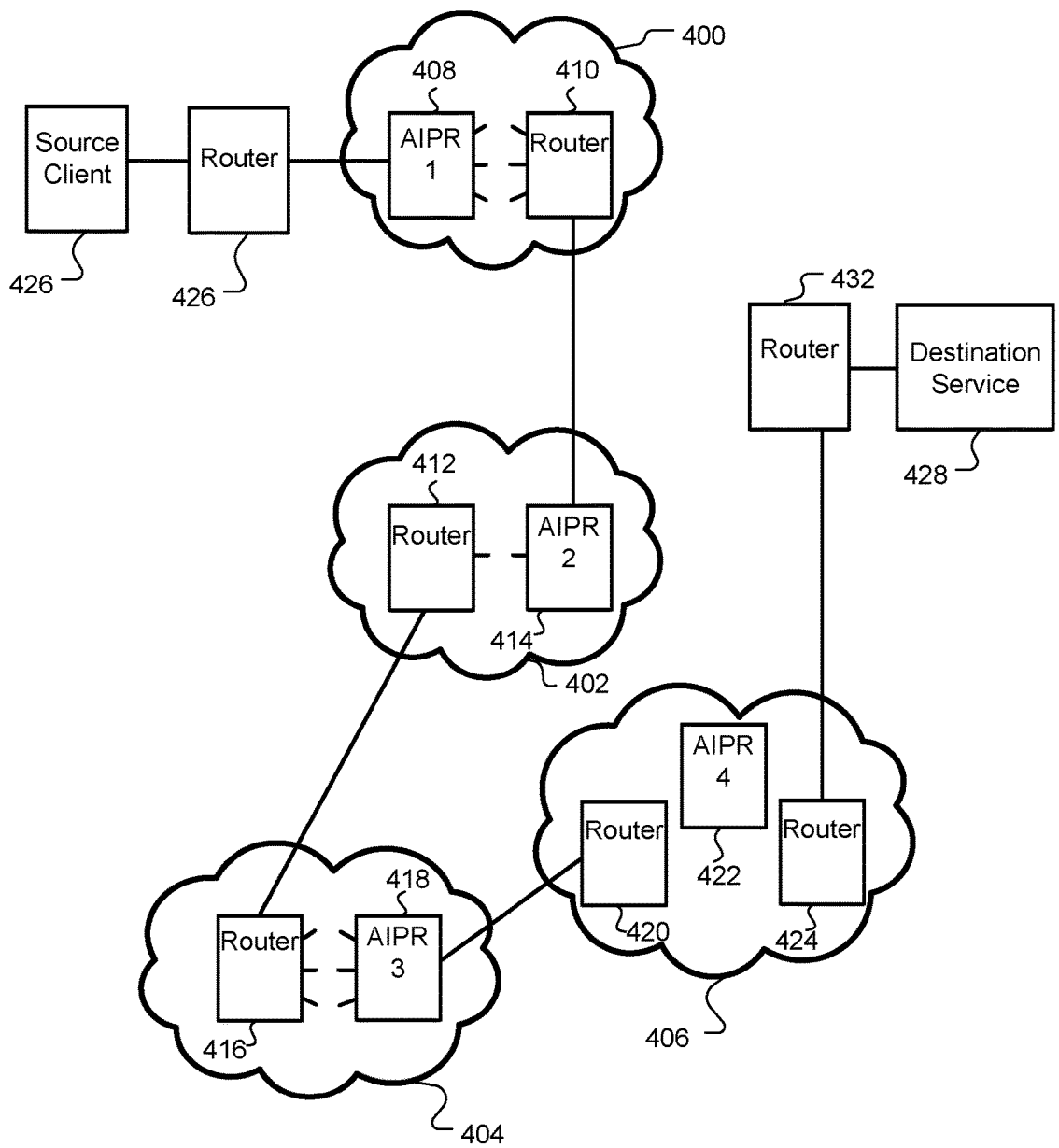
FIG. 4 is a schematic diagram of a hypothetical internet that includes a conventional routers and augmented IP routers (AIPRs), according to an embodiment of the present invention.

A packet flow controller (also referred to herein as an augmented IP router ("AIPR")) ensures that subsequent packets of a session follow the same path as the lead packet of the session, as discussed above. An AIPR also performs conventional routing functions. FIG. 4 is a schematic diagram illustrating a hypothetical set of interconnected networks 400, 402, 404 and 406, i.e., an internet. Each network 400-406 includes a number of routers and AIPRs, not all of which are necessarily shown. Network 400 includes AIPR 1 408 and router 410. Network 400 may be, for example, a network of a telecommunications carrier. Network 402 includes a router 412 and AIPR 2 414. Network 402 may be, for example, a network of a first ISP. Network 404 includes a router 416 and AIPR 3 418. Network 404 may be, for example, the Internet backbone or a portion thereof. Network 406 includes a router 420, AIPR 4 422 and another router 424. Network 406 may be, for example, a network of a second ISP.

Assume a source client node 426 initiates a session with a destination service node 428. For example, the source client 426 may request a web page, and the destination service node 428 may include a web server. The source client 426 may, for example, be part of a first local area network (LAN) (not shown) within a first corporation, and the LAN may be connected to the telecommunications carrier network 400 via a gateway router 430 operated by the corporation. Similarly, the destination service node 428 may be operated by a second corporation, and it may be part of a second LAN (not shown) coupled to the network 406 of the second ISP via a gateway router 432 operated by the second corporation. As a lead packet of the session traverses the internet, each AIPR (waypoint) the packet traverses records information that eventually enables the waypoint to be able to identify its immediately previous waypoint and its immediately next waypoint, with respect to the session.

The lead packet of the session is naturally routed. Assume the lead packet reaches AIPR 1 408 before it reaches network 402, 404 or 406. AIPR 1 408 automatically identifies the lead packet as being an initial packet of the session. AIPR 1 408 may use various techniques to identify the beginning of a session, as noted above and as discussed in more detail below. AIPR 1 408 becomes the first waypoint along a path the lead packet eventually follows.

AIPR 1 408 assigns a unique identifier to the session and stores information about the session in the AIPR's database to enable the AIPR 1 408 to identify subsequent packets of the session. In some embodiments, AIPR 1 408 reads the client socket/service socket number pair in the lead packet and stores the client socket/service socket number pair in a database to uniquely identify the session. This enables the AIPR 1 408 to identify the subsequent packets as being part of the session, because all subsequent packets of the session will contain the same client socket/service socket number pair.

In some embodiments, AIPR 1 408 sets a flag in its database to indicate the lead packet has not traversed any other AIPR before reaching AIPR 1 408. This flag may be used later, for example when the AIPR 1 408 handles return packets. AIPR 1 408 may be able to identify the lead packet as not having traversed any other AIPR by lack of any modification to the packet. Packet modification is described below.

AIPR 1 408 modifies the lead packet to indicate the lead packet has been handled by an AIPR. In some embodiments, the AIPR 1 408 stores the unique identifier of the session and, if not included in the unique identifier, the AIPR's network address in the packet to produce a modified lead packet. Subsequent AIPRs, if any, that handle the (now modified) lead packet use this modification to identify the lead packet as a lead packet that has been handled by an AIPR, and to indicate that subsequent packets of the session should be routed the same way as the lead packet is routed.

In some embodiments, AIPR 1 408 assigns a port number on the interface over which AIPR 1 408 will forward the lead packet. The AIPR's network address and this port number, in combination, may be used as a unique identifier of the session, at least from the point of view of the next AIPR along the path. AIPR 1 408 may include the AIPR's network address-port number combination in the modified lead packet. Thus, the next AIPR along the path may assume that subsequent packets sent from this network address-port number combination are part of, or likely to be part of, the session.

AIPR 1 408 then forwards the lead packet naturally. The lead packet traverses an unspecified number of nodes of network 400 until it reaches router 410, which naturally routes the lead packet to network 402. Assume the router 410 forwards the lead packet to AIPR 2 414 in network 402.

AIPR 2 414 detects the modification to the lead packet, identifying a need for special treatment. AIPR 2 414 becomes the second waypoint along the path the lead packet will follow. AIPR 2 414 stores in its database the network address of AIPR 1 408 and the port number assigned by AIPR 1 408, in association with a unique identifier of the session, such as the client and server socket number pair, thus identifying the previous waypoint along the path in association with the session. In this way, each waypoint learns the network address and port number of the previous waypoint along this session's path and uses a related association device (an "associator") to associate this information with a session identifier. This information may be used later to forward return packets, from waypoint to waypoint, back to the source client 426.

In some embodiments, AIPR 2 414 assigns a port number on the interface over which the lead packet was received. The AIPR's network address and this port number, in combination, may be used as a unique identifier of the session, at least from the point of view of AIPR 1 408. Thus, subsequent packets addressed to this network address-port number combination may be assumed to be, or at least are likely to be, part of the session.

In some embodiments, AIPR 2 414 sends a packet back to AIPR 1 408 to inform AIPR 1 408 of the network address-port number combination, in association with the identification of the session. In some embodiments, the network address-port number combination are sent to AIPR 1 408 later, in connection with a return packet, as described below. In either case, AIPR 1 408 learns a network address-port number combination unique to the session, and AIPR 1 408 sends subsequent packets to that address-port combination, rather than naturally forwarding the subsequent packets. In this way, each waypoint learns the network address and port number of the next waypoint along this session's path. This information is used to forward subsequent packets, from waypoint to waypoint, forward to the destination service 428, along the same path as the lead packet. This kind of routing is unlike any routing taught by the prior art known to the inventors.

AIPR 2 214 modifies the lead packet to include the network address of AIPR 2 214, and then forwards the lead packet naturally. As with AIPR 1 408, in some embodiments AIPR 2 214 assigns a port number on the interface over which AIPR 2 214 forwards the packet, and the network address of AIPR 2 214 and the port number are included in the modified lead packet AIPR 2 214 sends.

The lead packet traverses an unspecified number of nodes of network 402, until it reaches router 412, which naturally routes the lead packet to network 404. Assume the router 416 forwards the lead packet to AIPR 3 418.

AIPR 3 418 becomes the third waypoint along the path the lead packet will follow. AIPR 3 418 operates much as AIPR 2 414. The lead packet is then forwarded to network 406, where it traverses AIPR 4 422, which becomes the fourth waypoint. Three scenarios are possible with respect to the last AIPR 422 (AIPR 4) along the path to the destination service 428.

In the first scenario, one or more AIPRs relatively close to a destination service are provisioned to handle lead packets for the destination service. The AIPRs may be so provisioned by storing information in their databases to identify the destination service, such as by the service socket number or other unique identifier of the service. These "terminus" AIPRs broadcast their ability to forward packets to the destination service. A terminus AIPR is an AIPR that can forward packets to a destination service, without the packets traversing another AIPR. A terminus AIPR recognizes a lead packet destined to a service that terminates at the AIPR by comparing the destination service socket number to the information provisioned in the AIPR's database.

If AIPR 4 422 has been so provisioned, AIPR 4 422 may restore the lead packet to its original form, i.e., the form the lead packet had when the source client 426 sent the lead packet, or as the packet might have been modified by the router 430, such as a result of network address translation (NAT) performed by the router 430. Thus, the lead packet may be restored to a form that does not include any of the modifications made by the waypoints 408, 414 and 418. AIPR 4 422 then forwards the lead packet to the destination service 428. Like AIPR 3 418, AIPR 4 422 stores information in its database identifying AIPR 3 418 as the previous AIPR for this session.

In the second scenario, AIPR 4 422 is not provisioned with information about the destination service 428. In such embodiments, AIPR 4 422 may operate much as AIPR 2 414 and AIPR 3 418 operate. AIPR 4 422 modifies and naturally forwards the lead packet, and the lead packet is eventually delivered to the destination service 428. The destination service 428 responds to the lead packet. For example, if the lead packet is a SYN packet to initiate a TCP session, the destination service 428 responds with an ACK or SYN/ACK packet. AIPR 4 422 recognizes the return packet as being part of the session, such as based on the source client/destination service network address/port number pairs in the return packet. Furthermore, because the return packet was sent by the destination service 428, and not another AIPR, AIPR 4 422 recognizes that it is the last AIPR along the path for this service.

AIPR 4 422 stores information in its database indicating AIPR 4 422 is a terminus AIPR. If AIPR 4 422 receives subsequent packets of the session, AIPR 4 422 may restore the subsequent packets to their original forms, i.e., the forms the subsequent packets had when the source client 426 sent the subsequent packets, or as the packets might have been modified by the router 430, such as a result of network address translation (NAT) performed by the router 430. AIPR 4 422 forwards the subsequent packets to the destination service 428.

AIPR 4 422 modifies the return packet to include a port number on the interface AIPR 4 422 received the lead packet from AIPR 3 418, as well as the network address of AIPR 4 422. AIPR 4 422 then forwards the return packet to AIPR 3 418. Although the return packet may be forwarded by other routers, AIPR 4 422 specifically addresses the return packet to AIPR 3 418. This begins the return packet's journey back along the path the lead packet traveled, through all the waypoints traversed by the lead packet, in reverse order. Thus, the return packet is not naturally routed back to the source client 426. This kind of return packet routing is unlike any routing taught by the prior art known by the inventors.

AIPR 3 418 receives the modified return packet and, because the return packet was addressed to the port number AIPR 3 418 previously assigned and associated with this session, AIPR 3 418 can assume the return packet is part of, or likely part of, the session. AIPR 3 418 copies the network address and port number of AIPR 4 422 from the return packet into the AIPR's database as the next waypoint for this session. If AIPR 3 418 receives subsequent packets of the session, AIPR 3 418 forwards them to the network address and port number of the next waypoint, i.e., AIPR 4 422.

Thus, once an AIPR is notified of a network address and port number of a next AIPR along a session path, the AIPR forwards subsequent packets to the next AIPR, rather than naturally routing the subsequent packets.

AIPR 3 418 forwards the return packet to AIPR 2 414, whose network address and port number were stored in the database of AIPR 3 418 and identified as the previous waypoint of the session. Likewise, each of the waypoints along the path back to the source client 426 forwards the return packet to its respective previous waypoint.

When the first waypoint, i.e., AIPR 1 408, receives the return packet, the waypoint may restore the return packet to its original form, i.e., the form the return packet had when the destination service 428 sent the return packet, or as the packet might have been modified by the router 430, such as a result of network address translation (NAT) performed by the router 430. Recall that the first waypoint set a flag in its database to indicate the lead packet had not traversed any other waypoint before reaching the first waypoint. This flag is used to signal the first waypoint to restore the return packet and forward the restored return packet to the source client 426. The first waypoint forwards the return packet to the source client 426. Subsequent return packets are similarly handled.

In the third scenario, not shown in FIG. 4, the last AIPR to receive the lead packet has a network address equal to the network address of the destination service. For example, the destination service network address may be given to a gateway router/AIPR, and the gateway router/AIPR may either process the service request or its router table may cause the packet to be forwarded to another node to perform the service. The last AIPR may restore the lead packet and subsequent packets, as described above.

Lead Packet Identification

As noted, a waypoint should be able to identify a lead packet of a session. Various techniques may be used to identify lead packets. Some of these techniques are protocol-specific. For example, a TCP session is initiated according to a well-known three-part handshake involving a SYN packet, a SYN-ACK packet and an ACK packet. By statefully following packet exchanges between pairs of nodes, a waypoint can identify a beginning of a session and, in many cases, an end of the session. For example, A TCP session may be ended by including a FIN flag in a packet and having the other node send an ACK, or by simply including an RST flag in a packet. Because each waypoint stores information about each session, such as the source client/destination service network address/port number pairs, the waypoint can identify the session with which each received packet is associated. The waypoint can follow the protocol state of each session by monitoring the messages and flags, such as SYN and FIN, sent by the endpoints of the session and storing state information about each session in its database. Such stateful monitoring of packet traffic is not taught by the prior art known to the inventor. Instead, the prior art teaches away from this type of session.

It should be noted that a SYN packet may be re-transmitted—each SYN packet does not necessarily initiate a separate session. However, the waypoint can differentiate between SYN packets that initiate a session and re-transmitted SYN packets based on, for example, the response packets.

Where a protocol does not define a packet sequence to end a session, the waypoint may use a timer. After a predetermined amount of time, during which no packet is handled for a session, the waypoint may assume the session is ended. Such a timeout period may also be applied to sessions using protocols that define end sequences.

Table 2 describes exemplary techniques for identifying the beginning and end of a session, according to various protocols. Similar techniques may be developed for other protocols, based on the definitions of the protocols.

TABLE 2

| Protocol | Destination Port | Technique for Start/End Determination |
|---|---|---|
| TCP | Any | Detect start on the first SYN packet from a new address/port unique within the TCP protocol's guard time between address/port reuse. Following the TCP state machine to determine an end (FIN exchange, RST, or guard timeout). |
| UDP-TFTP | 69 | Trap on the first RRQ or WRQ message to define a new session, trap on an undersized DAT packet for an end of session. |
| UDP-SNMP | 161, 162 | Trap on the message type, including GetRequest, SetRequest, GetNextRequest, GetBulkRequest, InformRequest for a start of session, and monitor the Response for end of session. For SNMP traps, port 162 is used, and the flow of data generally travels in the "reverse" direction. |
| UDP-SYSLOG | 514 | A single message protocol, thus each message is a start of session, and end of session. |
| UDP-RTP | Any | RTP has a unique header structure, which can be reviewed/analyzed to identify a start of a session. This is not always accurate, but if used in combination with a guard timer on the exact same five-tuple address, it should work well enough. The end of session is detected through a guard timer on the five-tuple session, or a major change in the RTP header. |
| UDP-RTCP | Any | RTCP also has a unique header, which can be reviewed, analyzed, and harvested for analytics. Each RTCP packet is sent periodically and can be considered a "start of session" with the corresponding RTCP response ending the session. This provides a very high quality way of getting analytics for RTCP at a network middle point, without using a Session Border Controller |
| UDP-DNS (Nameserver) | 53 | Each DNS query is a single UDP message and response. By establishing a forward session (and subsequent backward session) the Augmented router gets the entire transaction. This allows analytics to be gathered and manipulations that are appropriate at the Augmented router. |
| UDP-NTP | 123 | Each NTP query/response is a full session. So, each query is a start, and each response is an end. |

Figure 5:
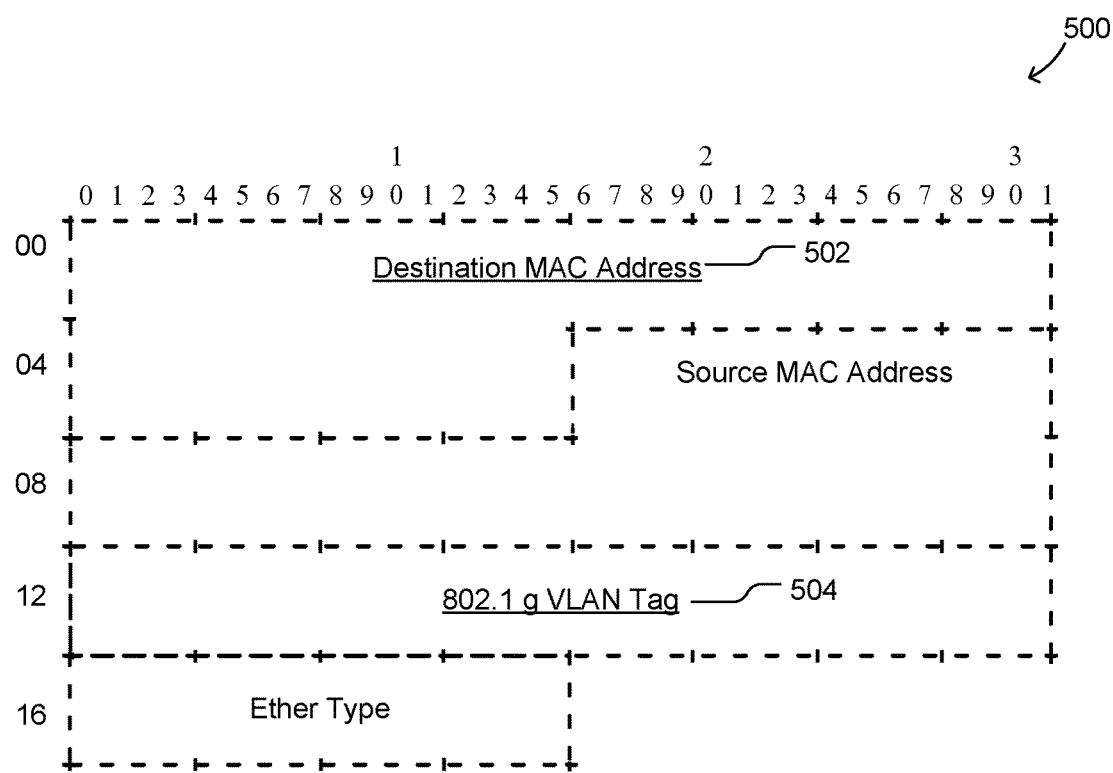
FIG. 5 is a schematic layout of an Ethernet header, identifying fields used for identifying a beginning of a session, according to an embodiment of the present invention.
Figure 6:
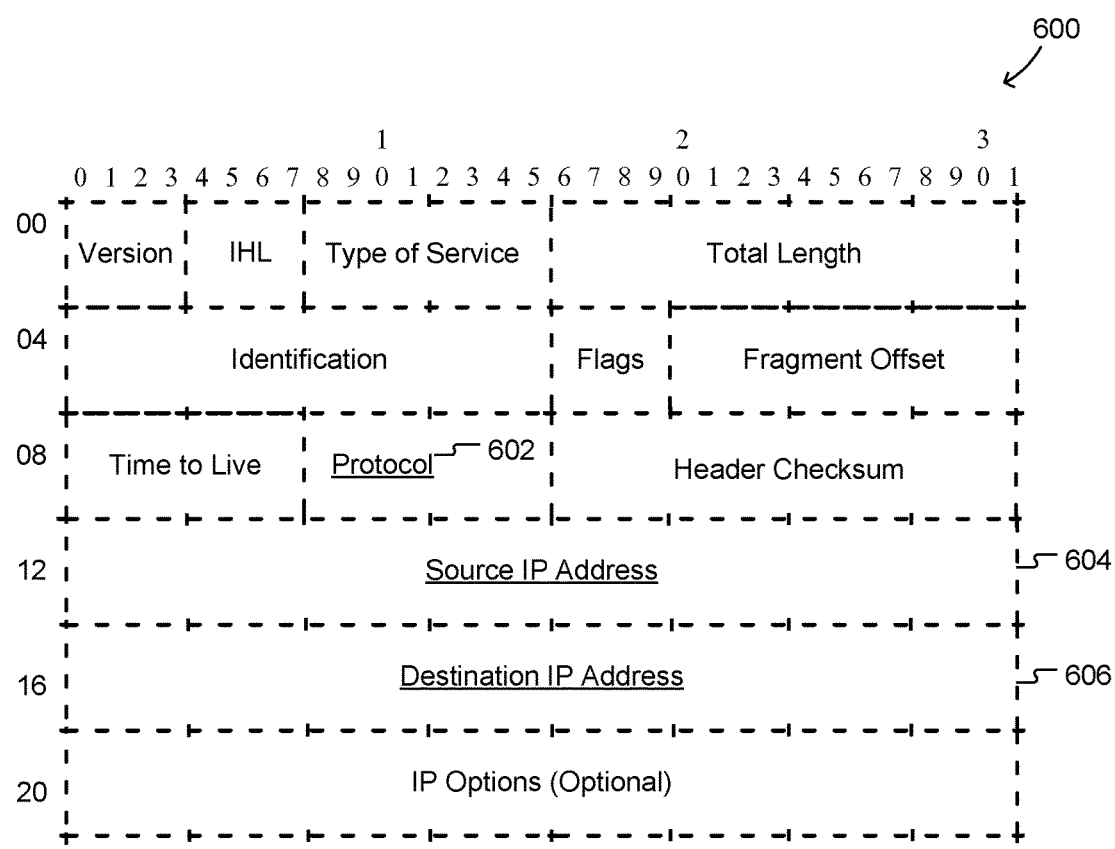
FIG. 6 is a schematic layout of an IP header, identifying fields used for identifying a beginning of a session, according to an embodiment of the present invention.
Figure 7:
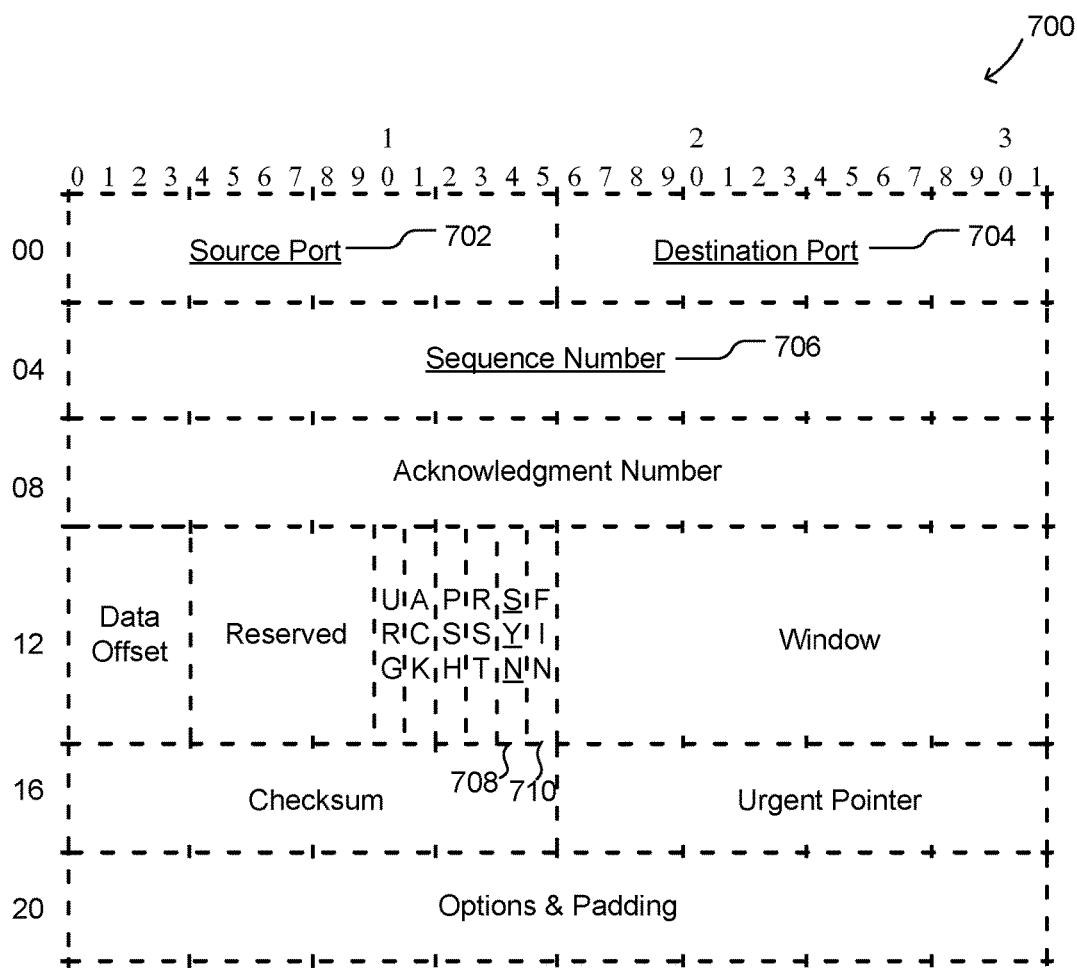
FIG. 7 is a schematic layout of a TCP header, identifying fields used for identifying a beginning of a session, according to an embodiment of the present invention.

FIG. 5 is a schematic layout of an Ethernet header 500, including a Destination MAC Address 502 and an 802.1q VLAN Tag 504. FIG. 6 is a schematic layout of an IP header 600, including a Protocol field 602, a Source IP Address 604 and a Destination IP Address 606. FIG. 7 is a schematic layout of a TCP header 700, including a Source Port 702, a Destination Port 704, a Sequence Number 706, a SYN flag 708 and a FIN flag 710. These packets and the identified fields may be used to identify the beginning of a session, as summarized in Table 3.

TABLE 3

| Data Item | Where From | Description |
|---|---|---|
| Physical Interface | Ethernet Header | This is the actual port that the message was received on, which can be associated or discerned by the Destination MAC Address |
| Tenant | Ethernet Header OR Source MAC Address & Previous Advertisement | Logical association with a group of computers. |
| Protocol | IP Header | This defines the protocol in use and, for the TCP case, it must be set to a value that corresponds to TCP |
| Source IP Address | IP Header | Defines the source IP Address of the initial packet of a flow. |
| Destination IP Address | IP Header | Defines the destination IP Address of the initial packet of a flow. |
| Source Port | TCP Header | Defines the flow instance from the source. This may reflect a client, a firewall in front of the client, or a carrier grade NAT. |
| Destination Port | TCP Header | This defines the desired service requested, such as 80 for HTTP. |
| Sequence Number | TCP Header | This is a random number assigned by the client. It may be updated by a firewall or carrier grade NAT. |
| SYN Bit On | TCP Header | When the SYN bit is on, and no others, this is an initial packet of a session. It may be retransmitted if there is no response to the first SYN message. |

Augmented IP Router (AIPR)

Figure 8:
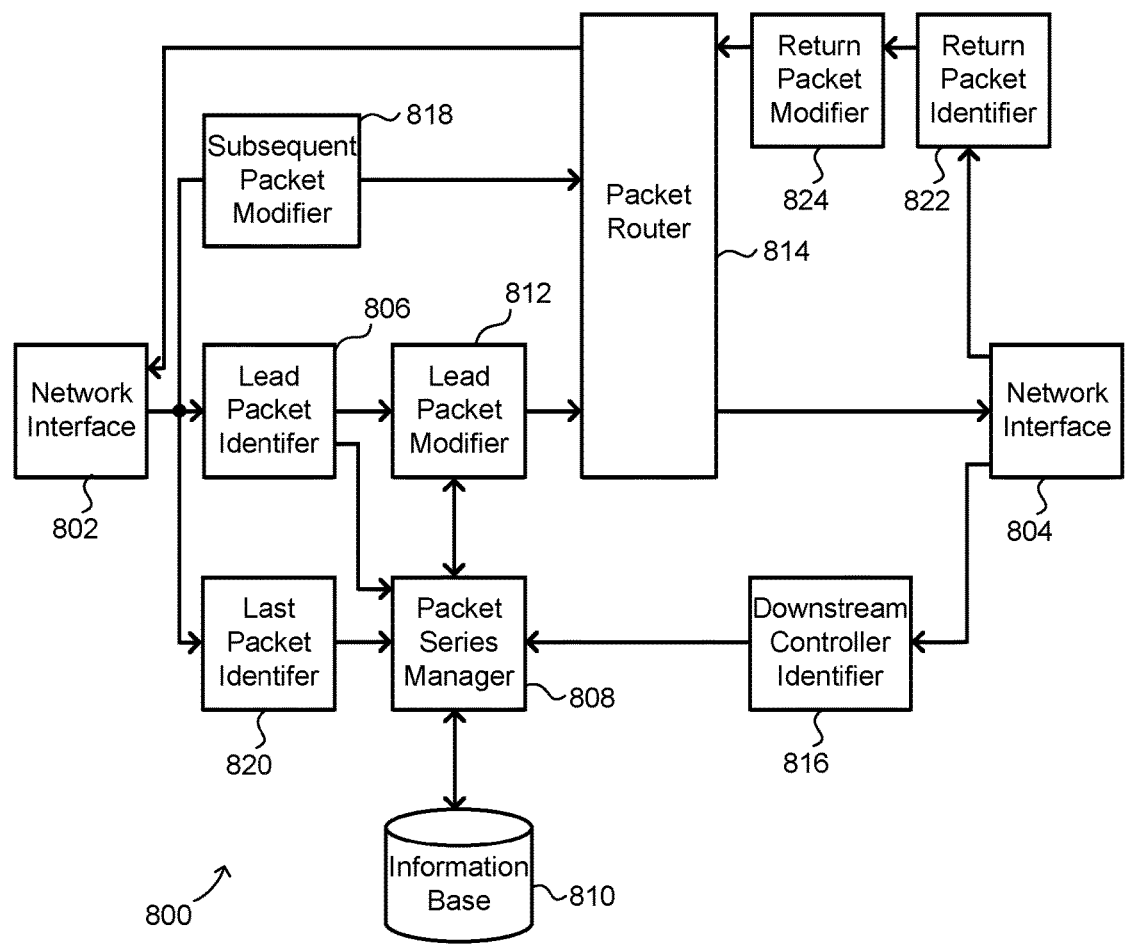
FIG. 8 is a schematic block diagram of an AIPR of FIG. 4, according to an embodiment of the present invention.

FIG. 8 is a schematic block diagram of an AIPR (waypoint) 800 configured in accordance with illustrative embodiments of the invention. The AIPR 800 includes at least two network interfaces 802 and 804, through which the AIPR 800 may be coupled to two networks. The interfaces 802 and 804 may be, for example, Ethernet interfaces. The AIPR 800 may send and receive packets via the interfaces 802 and 804.

A lead packet identifier 806 automatically identifies lead packets, as discussed herein. In general, the lead packet identifier 806 identifies a lead packet when the lead packet identifier 806 receives a packet related to a session that is not already represented in the AIPR's information base 810, such as a packet that identifies a new source client/destination service network address/port number pair. As noted, each lead packet is an initial, non-dropped, packet of a series of packets (session). Each session includes a lead packet and at least one subsequent packet. The lead packet and all the subsequent packets are sent by the same source client toward the same destination service, for forward flow control. For forward and backward flow control, all the packets of the session are sent by either the source client or the destination service toward the other.

A session (packet series) manager 808 is coupled to the lead packet identifier 806. For each session, the session manager assigns a unique identifier. The unique identifier may be, for example, a combination of the network address of the AIPR 800 or of the interface 802, in combination with a first port number assigned by the session manager 808 for receiving subsequent packets of this session. The unique identifier may further include the network address of the AIPR 800 or of the other interface 804, in combination with a second port number assigned by the session manager 808 for transmitting the lead packet and subsequent packets. This unique identifier is associated with the session. The session manager 808 stores information about the session in an information base 810. This information may include the unique identifier, in association with the original source client/destination service network address/port number pairs.

Figure 9:
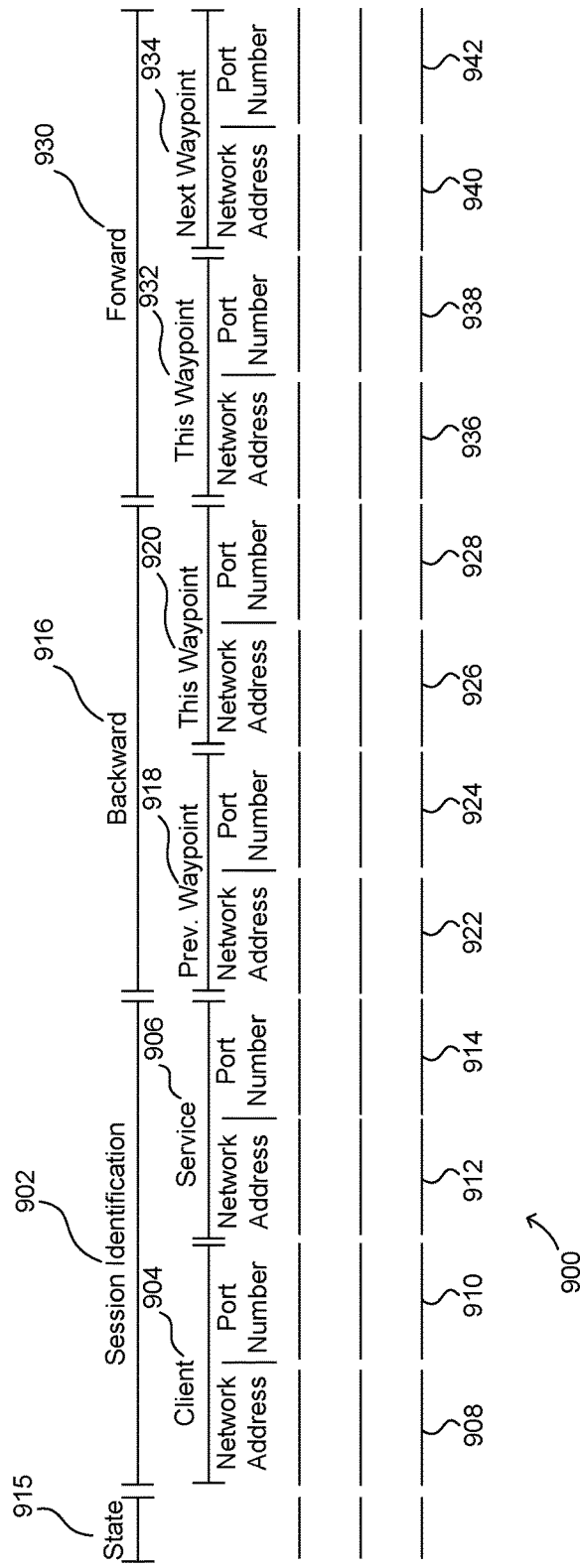
FIG. 9 is a schematic illustration of information stored in an information base by the AIPR of FIGS. 4 and 8, according to an embodiment of the present invention.

FIG. 9 is a schematic layout of an exemplary waypoint information base 900. Each row represents a session. A session identification column 902 includes sub-columns for the source client 904 and the destination service 906. For each client 904, its network address 908 and port number 910 are stored. For each destination service 906, its network address 912 and port number 914 are stored. This information is extracted from the lead packet.

State information about the session may be stored in a state column 915. This information may be used to statefully follow a series of packets, such as when a session is being initiated or ended.

A backward column includes sub-columns for storing information 916 about a portion of the backward path, specifically to the previous AIPR. The backward path information 916 includes information 918 about the previous AIPR and information 920 about the present AIPR 800. The information 918 about the previous AIPR includes the AIPR's network address 922 and port number 924. The session manager 808 extracts this information from the lead packet, assuming the lead packet was forwarded by an AIPR. If, however, the present AIPR 800 is the first AIPR to process the lead packet, the information 918 is left blank as a flag. The information 920 about the present AIPR 800 includes the network address 926 of the interface 802 over which the lead packet was received, as well as the first port number 928 assigned by session manager 808.

The waypoint information base 900 is also configured to store information 930 about a portion of the forward path, specifically to the next AIPR. This information 930 includes information 932 about the present AIPR 800 and information 934 about the next AIPR along the path, assuming there is a next AIPR. The information 932 includes the network address 936 of the interface over which the present AIPR will send the lead packet and subsequent packets, as well as the second port number 938 assigned by the session manager 808. The information 934 about the next AIPR along the path may not yet be available, unless the AIPR is provisioned with information about the forward path. The information 934 about the next AIPR includes its network address 940 and port number 942. If the information 934 about the next AIPR is not yet available, the information 934 may be filled in when the AIPR 800 processes a return packet, as described below.

Some embodiments of the waypoint information base 900 may include the forward information 930 without the backward information 916. Other embodiments of the waypoint information base 900 may include the backward information 916 without the forward information 930.

Returning to FIG. 8, a lead packet modifier 812 is coupled to the session manager 808. The lead packet modifier 812 modifies the lead packet to store the unique identifier associated with the session. The original source client network address/port number pair, and the original destination service network address/port number pair, are stored in the modified lead packet, if necessary. The lead packet may be enlarged to accommodate the additional information stored therein, or existing space within the lead packet, such a vendor specific attribute field, may be used. Other techniques for transmitting additional information are protocol specific, for example with TCP, the additional information could be transmitted as a TCP Option field, or added to the SYN packet as data. In either case, the term session data block is used to refer to the information added to the modified lead packet.

Figure 10:
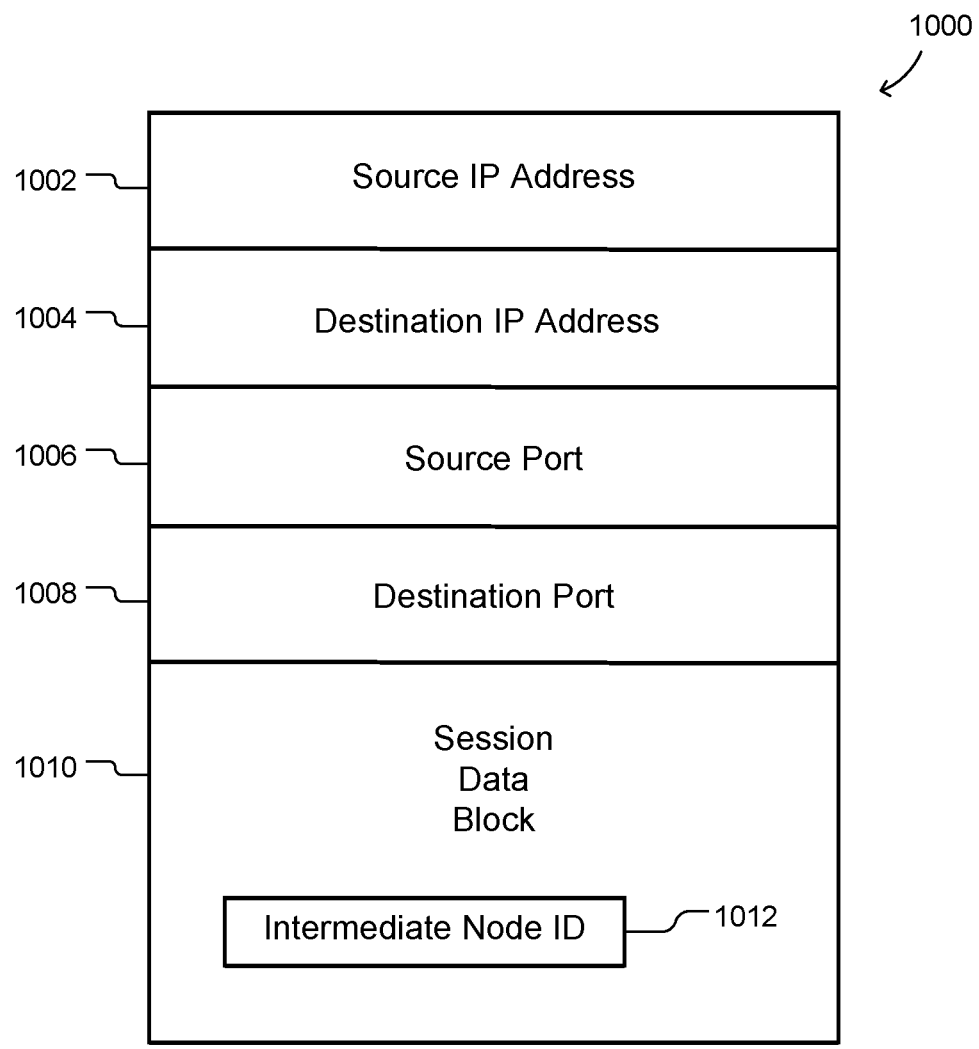
FIG. 10 is a schematic diagram of a modified lead packet produced by the AIPR of FIGS. 4 and 8, according to an embodiment of the present invention.

FIG. 10 is a schematic diagram of an exemplary modified lead packet 1000 showing the original source and destination IP addresses 1002 and 1004, respectively, and the original source and destination port numbers 1006 and 1008, respectively. FIG. 10 also shows a session data block 1010 in the modified lead packet 1000. Although the session data block 1010 is shown as being contiguous, it may instead have its contents distributed throughout the modified lead packet 1000. The session data block 1010 may store an identification of the sending AIPR, i.e., an intermediate node identifier 1012, such as the network address of the second network interface 804 and the second port number.

Returning to FIG. 8, the lead packet modifier 812 updates the packet length, if necessary, to reflect any enlargement of the packet. The lead packet modifier 812 updates the checksum of the packet to reflect the modifications made to the packet. The modified lead packet is then transmitted by a packet router 814, via the second network interface 804. The modified lead packet is naturally routed, unless the AIPR 800 has been provisioned with forward path information.

Eventually, the destination service sends a return packet. The AIPR 800 receives the return packet via the second interface 804. If another AIPR (downstream AIPR) between the present AIPR 800 and the destination service handles the lead packet and the return packet, the downstream AIPR modifies the return packet to include the downstream AIPR's network address and a port number. A downstream controller 816 identifier uses stateful inspection, as described herein, to identify the return packet. The downstream controller 816 stores information 934 (FIG. 9), specifically the network address and port number, about the next AIPR in the waypoint information base 900.

The present AIPR 800 may use this information to address subsequent packets to the next AIPR. Specifically, a subsequent packet modifier 818 may set the destination address of the subsequent packets to the network address and port number 940 and 942 (FIG. 9) of the next waypoint, instead of directly to the destination service. The packet router 814 sends the subsequent packets, according to their modified destination addresses. Thus, for each series of packets, subsequent packets flow through the same downstream packet flow controllers as the lead packet of the series of packets.

A last packet identifier 820 statefully follows each session, so as to identify an end of each stream, as discussed above. As noted, in some cases, the end is signified by a final packet, such as a TCP packet with the RST flag set or a TCP ACK packet in return to a TCP packet with the FIN flag set. In other cases, the end may be signified by a timer expiring. When the end of a session is detected, the packet series manager 808 disassociates the unique identifier from the session and deletes information about the session from the waypoint information base 900.

Where the AIPR 800 is provisioned to be a last AIPR before a destination service, the lead packet modifier 806 restores the lead packet to the state the lead packet was in when the source client sent the lead packet, or as the lead packet was modified, such as a result of network address translation (NAT). Similarly, the subsequent packet modifier 818 restores subsequent packets.

Similarly, if the destination address of the lead packet is the same as the network address of the AIPR 800, or its network interface 802 over which it receives the lead packets, the lead packet modifier 806 and the subsequent packet modifier 818 restore the packet and subsequent packets.

As noted, in some protocols, several packets are required to initiate a session, as with the SYN-SYN/ACK-ACK handshake of the TCP. Thus, the downstream controller identifier 816 may wait until a second return packet is received from the destination service before considering a session as having started.

As noted, some embodiments of the waypoint 800 also manage return packet paths. The lead packet identifier 806 automatically ascertains whether a lead packet was forwarded to the waypoint 800 by an upstream waypoint. If the lead packet includes a session data block, an upstream waypoint forwarded the lead packet. The packet series manager 808 stores information about the upstream waypoint in the waypoint information base 810. A return packet identifier 822 receives return packets from the second network interface 804 and automatically identifies return packets of the session. These return packets may be identified by destination address and port number being equal to the information 932 (FIG. 9) in the waypoint information base corresponding to the session. A return packet modifier modifies the return packets to address them to the upstream waypoint for the session, as identified by the information 918 in the waypoint information base 900.

It should be noted that statefully monitoring packets is not done by conventional routers. The prior art known to the inventors teaches away from routers statefully monitoring packets. Statefully monitoring packets is, however, one aspect of the disclosed waypoint. This type of monitoring distinguishes embodiments of the present invention from the prior art.

Figure 11:
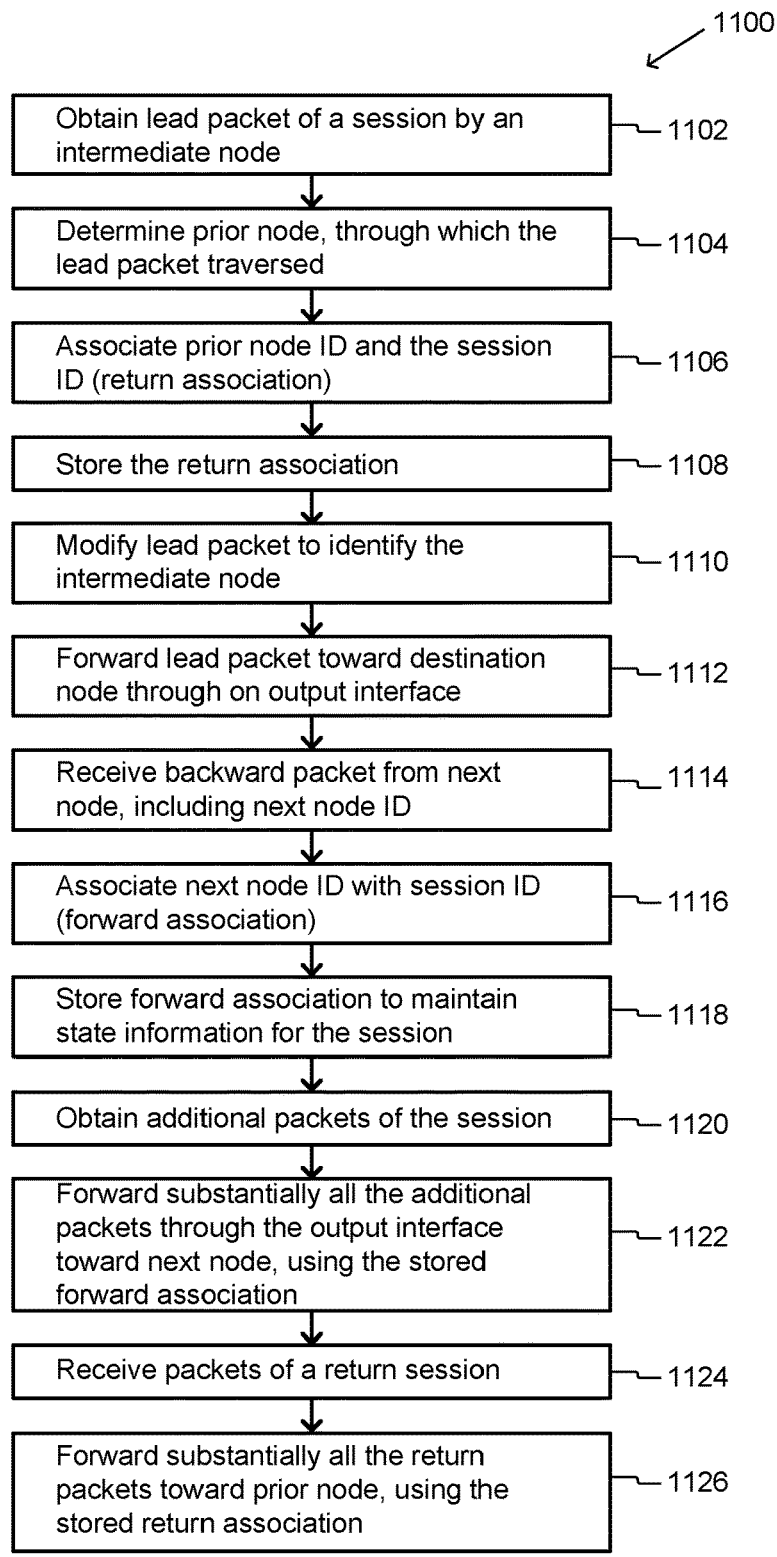
FIGS. 11 and 12 contain flowcharts schematically illustrating operations performed by the AIPR of FIGS. 4 and 8, according to an embodiment of the present invention.

FIG. 11 contains a flowchart 1100 schematically illustrating some operations performed by the AIPR 800 (FIG. 8) in accordance with illustrative embodiments of the invention. The flowchart 1100 illustrates a packet routing method for directing packets of a session from an originating node toward a destination node in an IP network. At 1102, an intermediate node obtains a lead packet of a plurality of packets in a session. The intermediate node may include a routing device or a switching device that performs a routing function.

The packets in the session have a unique session identifier. At 1104, a prior node, through which the lead packet traversed, is determined. The prior node has a prior node identifier. At 1106, a return association is formed between the prior node identifier and the session identifier. At 1108, the return association is stored in memory to maintain state information for the session.

At 1110, the lead packet is modified to identify at least the intermediate node. At 1112, the lead packet is forwarded toward the destination node though an intermediate node electronic output interface to the IP network. The electronic output interface is in communication with the IP network. At 1114, a backward message (e.g., a packet, referred to as a "backward packet") is received through an electronic input interface of the intermediate node. The backward message is received from a next node. The next node has a next node identifier. The backward message includes the next node identifier and the session identifier. The electronic input interface is in communication with the IP network.

At 1116, a forward association is formed between the next node identifier and the session identifier. At 1118, the forward association is stored in memory, to maintain state information for the session. At 1120, additional packets of the session are obtained. At 1122, substantially all of the additional packets in the session are forwarded toward the next node, using the stored forward association. The additional packets are forwarded through the electronic output interface of the intermediate node.

At 1124, a plurality of packets is received in a return session, or a return portion of the session, from the destination. The return session is addressed toward the originating node. At 1126, substantially all the packets in the return session are forwarded toward the prior node, using the stored return association. The packets are forwarded through the electronic output interface.

Figure 12:
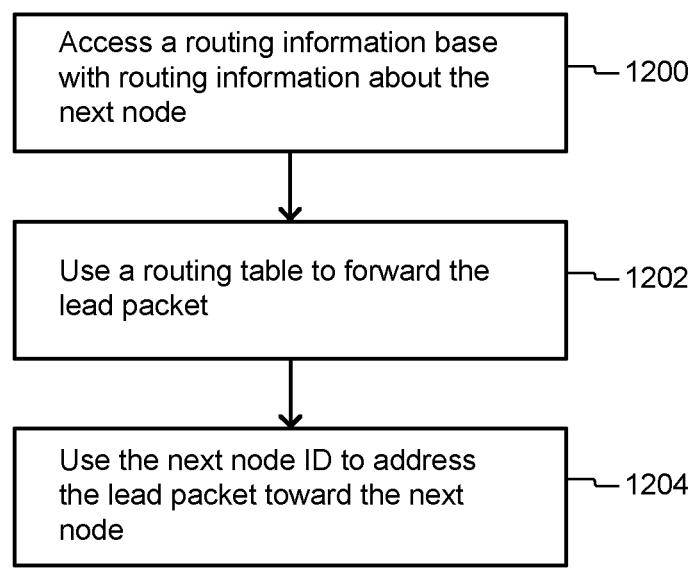

As shown at 1200 in FIG. 12, forwarding the lead packet 1112 toward the destination node may include accessing a routing information base having routing information for the next node. As shown at 1202, the intermediate node may have a routing table, and forwarding the lead packet 1112 toward the destination node may include using the routing table to forward the lead packet toward the destination node. As shown at 1204, forwarding the lead packet 1112 toward the destination node may include using the next node identifier to address the lead packet toward the next node.

The lead packet may be addressed so that a plurality of network devices receive the lead packet after it is forwarded and before the next node receives the lead packet.

An AIPR 800 and all or a portion of its components 802-824 may be implemented by a processor executing instructions stored in a memory, hardware (such as combinatorial logic, Application Specific Integrated Circuits (ASICs), Field-Programmable Gate Arrays (FPGAs) or other hardware), firmware or combinations thereof Extended Session Management In certain exemplary embodiments described above, sessions are identified based on a combination of an AIPR network address and a source port number assigned by the AIPR. For example, upon receiving the lead packet for a session (either the original lead packet received by the first waypoint AIPR or a modified lead packet received by a downstream waypoint AIPR), each waypoint AIPR can assign a source port number for the session and include the assigned source port number as part of a modified lead packet forwarded over an outgoing interface. A downstream AIPR that receives such a modified lead packet can use the combination of the received source network address (which can be the original source network address if the receiving AIPR is the first waypoint AIPR or can be the network address of the preceding upstream waypoint AIPR if the receiving AIPR is a downstream waypoint AIPR) and the received source port number as an identifier for the session. In certain exemplary embodiments, each waypoint AIPR later learns the port number assigned by the downstream AIPR (if any) and stores this destination port number in association with the session. The combination of an AIPR network address and a 16-bit source port number theoretically allows up to 2^16−1=65,535 sessions to be associated with a particular AIPR network address, which can be overly limiting in some situations.

Therefore, in various alternative embodiments, each waypoint AIPR identifies packets associated with a session using a 5-tuple of information including a source address, a source port number, a destination address, a destination port number, and a protocol identifier. Each intermediate waypoint AIPR assigns both the source port number and the destination port number for forwarding session-related packets to the next waypoint AIPR and conveys the assigned source port number and the assigned destination port number as part of the modified lead packet it forwards over an outgoing interface. A downstream AIPR that receives such a modified lead packet uses the 5-tuple of information from the received packet as return association information for the session. Thus, rather than assigning a port number for sending packets back to the sending AIPR, the receiving AIPR uses the received source and destination port numbers. By having an AIPR assign both port numbers and having the receiving AIPR use the assigned port numbers, the number of sessions that can be supported between the two AIPRs increases to at least $(65,535)^2$ sessions for a given source network address, destination network address, and protocol identifier.

FIG. 13 is a schematic representation of how source and destination port numbers can be associated with sessions for a given source (AIPR) network address, destination network address, and protocol identifier, in accordance with one exemplary embodiment. In this example, the first 65,535 sessions (i.e., starting with session number 1) are associated with source port number 1 with a different destination port number used for each of these sessions, the next 65,535 sessions (i.e., starting with session number 65,536) are associated with source port number 2 with a different destination port number used for each of these sessions, and so on. Thus, at least $(65,535)^2$ sessions can be supported between each pair of waypoint AIPRs rather than just 65,535.

Figure 14:
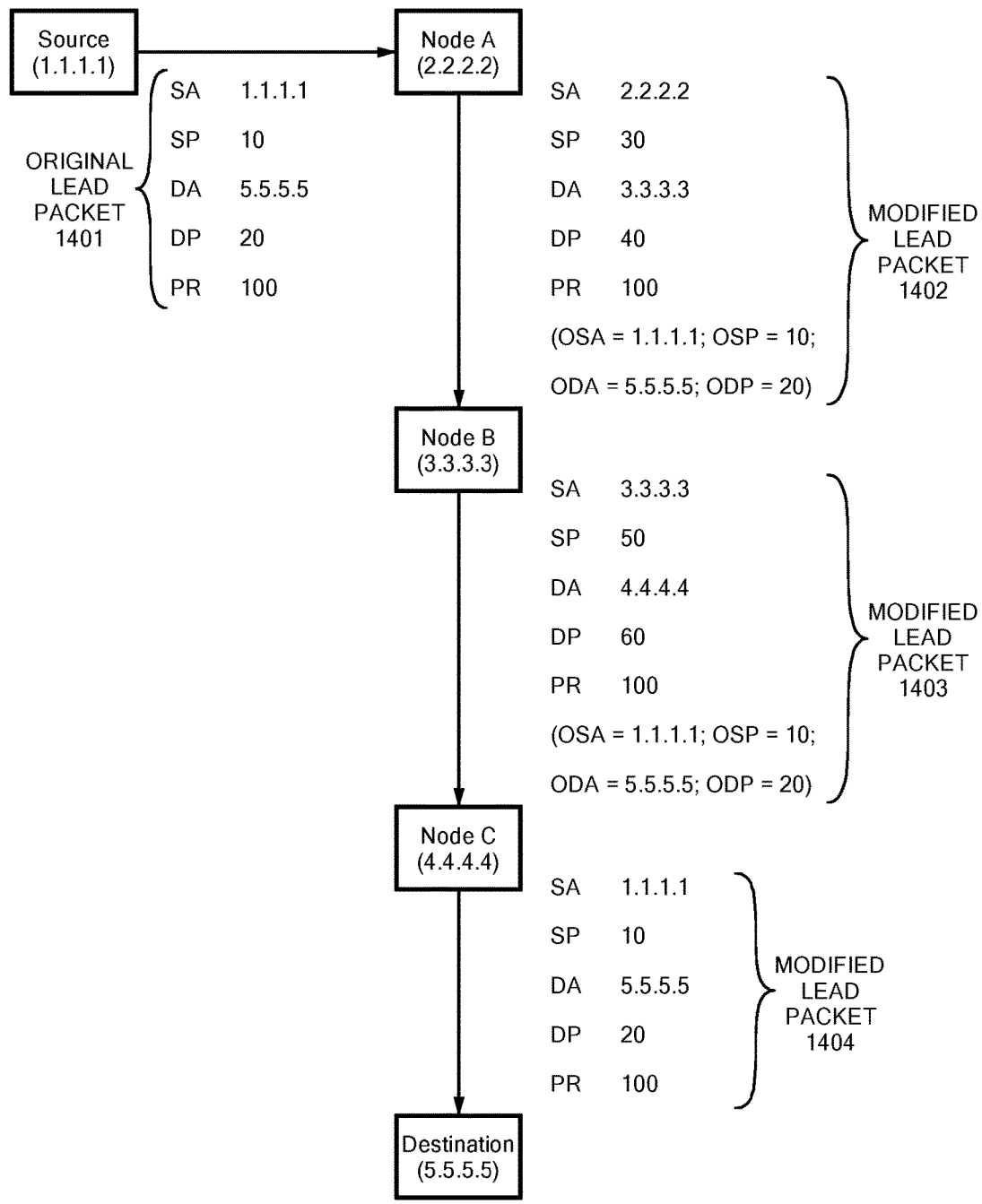
FIG. 14 is a schematic diagram providing an example of lead packet processing from a source device to a destination device through three AIPR devices, in accordance with certain illustrative embodiments of the invention.
Figure 18:
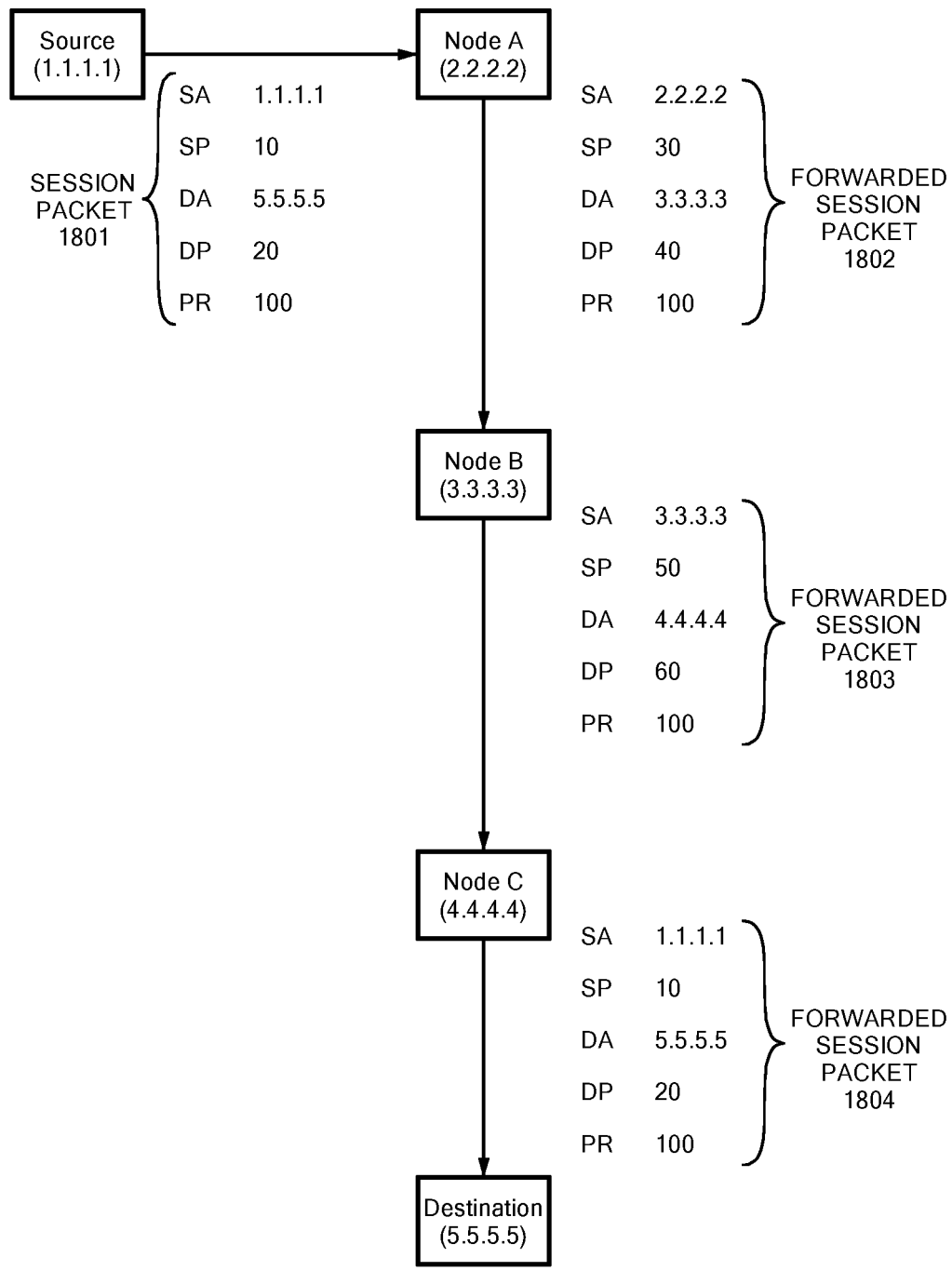
FIG. 18 is a schematic diagram providing an example of session packet processing for an example packet sent from the source device to the destination device through the AIPR devices for the session established in FIG. 14.
Figure 19:
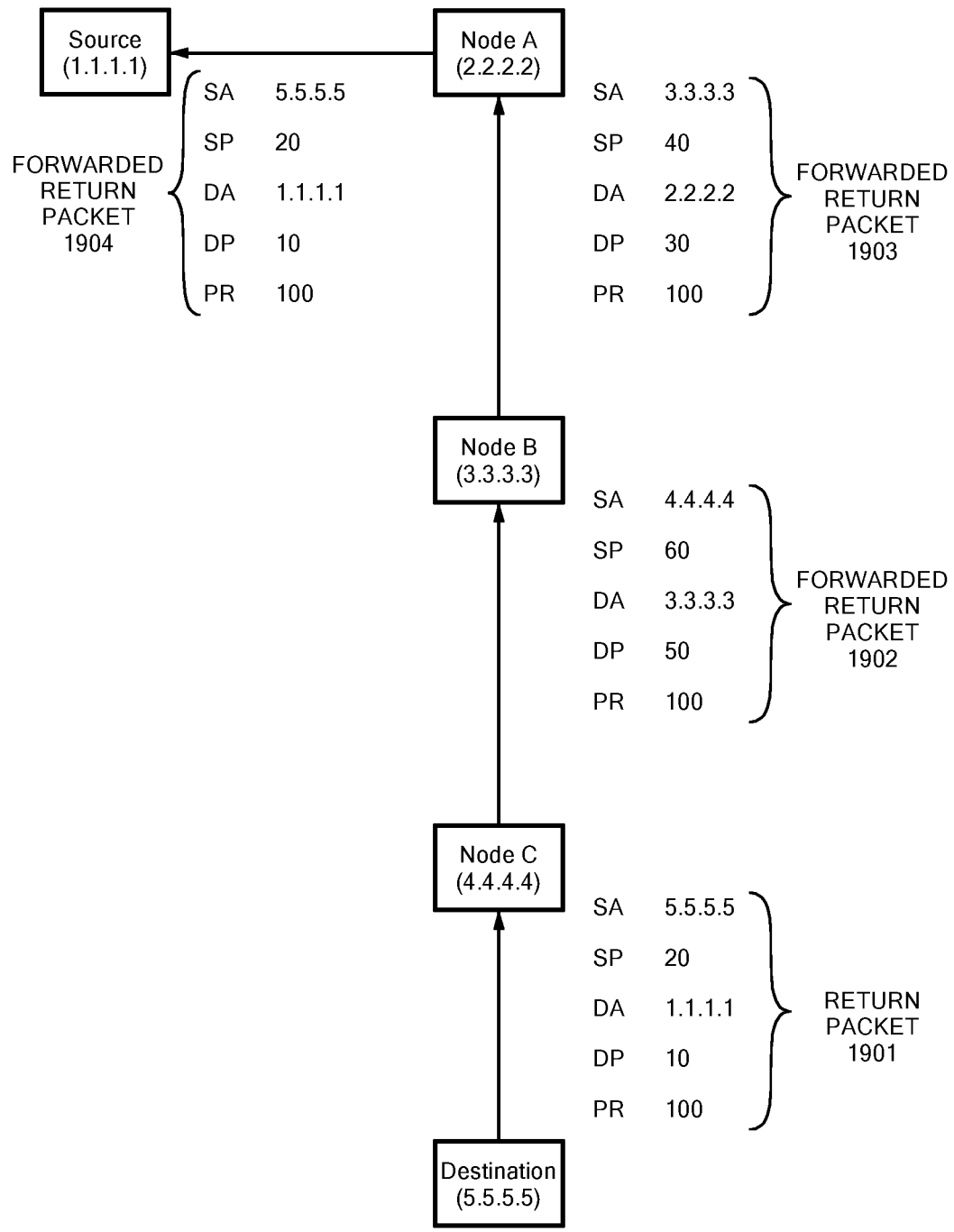
FIG. 19 is a schematic diagram providing an example of session packet processing for a return packet sent by the destination device to the source device through the AIPR devices for the session established in FIG. 14.

Extended session management based on a combination of source port number and destination port number is now demonstrated by example with reference to FIGS. 14-19. Specifically, FIG. 14 is a schematic diagram providing an example of lead packet processing from a source device to a destination device through three AIPR devices (referred to as "Node A," "Node B," and "Node C"), where the source device has network address 1.1.1.1; Node A has network address 2.2.2.2; Node B has network address 3.3.3.3; Node C has network address 4.4.4.4; and the destination device has network address 5.5.5.5. FIG. 15 is a schematic diagram showing session-related data associated with Node A based on the lead packet processing of FIG. 14. FIG. 16 is a schematic diagram showing session-related data associated with Node B based on the lead packet processing of FIG. 14. FIG. 17 is a schematic diagram showing session-related data associated with Node C based on the lead packet processing of FIG. 14. FIG. 18 is a schematic diagram providing an example of session packet processing for an example packet sent from the source device to the destination device through the AIPR devices for the session established in FIG. 14. FIG. 19 is a schematic diagram providing an example of session packet processing for a return packet sent by the destination device to the source device through the AIPR devices for the session established in FIG. 14.

In the following exemplary embodiments, each AIPR is presumed to have a priori knowledge of the other AIPRs in the network in relation to the network/next hop associations contained in its routing information base, such that, for example, a particular AIPR knows not only the outgoing port for a particular destination network address but also the next waypoint AIPR (if any) to use for that destination network address.

With reference again to FIG. 14, the source device sends an original lead packet 1401 to the destination device. In this example, the original lead packet 1401 includes a source address (SA) of 1.1.1.1; a source port number (SP) of 10; a destination address (DA) of 5.5.5.5; a destination port number (DP) of 20; and a protocol identifier (PR) of 100. For convenience, the combination of source address, source port number, destination address, destination port number, and protocol identifier in a packet is referred to hereinafter collectively as a "5-tuple."

In this example, Node A is the default router/gateway for source 1.1.1.1, so the lead packet 1401 is routed by the network to Node A, which identifies the lead packet 1401 as the lead packet for a new session as discussed above (in this example, referred to as "Session X"), and also determines that the lead packet 1401 is not a modified lead packet containing session metadata. Therefore, Node A determines that it is the first waypoint AIPR for Session X and stores an indicator so that it will process subsequent packets associated with the session as the first waypoint AIPR. This is represented in FIG. 15 as "Flag=First Waypoint AIPR."

Node A stores 5-tuple information from the received lead packet 1401 as the Return Association (RA) for Session X. This is represented in FIG. 15 as "Return Association" information. For convenience, the source address, source port number, destination address, destination port number, and protocol identifier information associated with a particular session is referred to in FIGS. 15-17 as session source address (SSA), session source port number (SSP), session destination address (SDA), session destination port number (SDP), and session protocol identifier (SPR), respectively.

In order to forward a modified lead packet (i.e., Modified Lead Packet 1402) over an outgoing interface, Node A accesses its routing information base to look up routing information for the original destination address of 5.5.5.5 (e.g., outgoing port and next node information). In this example, Node A identifies Node B as the next waypoint AIPR based on the original destination address of 5.5.5.5. Node A then assigns a source port number and a destination port number for outgoing packets associated with the session (in this example, source port number 30 and destination port number 40) and stores the resulting 5-tuple as the Forward Association (FA) for outgoing packets associated with the session. This is shown in FIG. 15 as "Forward Association" information. Implicitly, Node A's network address of 2.2.2.2 will be the source address for session-related packets forwarded over an outgoing interface.

Node A creates the modified lead packet 1402 using its stored Forward Association information. In this example, the modified lead packet 1402 includes Node A's network address of 2.2.2.2 as the source address (SA), the assigned session source port number (SSP) of 30 as the source port number (SP), Node B's address of 3.3.3.3 as the destination address (DA), the assigned session destination port number (SDP) of 40 as the destination port number (DP), and the received protocol identifier of 100 as the protocol identifier (PR). Node A also includes the original source address (OSA) of 1.1.1.1, the original source port number (OSP) of 10, the original destination address (ODA) of 5.5.5.5, and the original destination port number (ODP) of 20 as metadata in the modified lead packet 1402. This information is shown in parentheses in order to represent that it is metadata that has been added to the lead packet. Node A forwards the modified lead packet 1402 to Node B.

The modified lead packet 1402 reaches Node B, which identifies the modified lead packet 1402 as a lead packet for a new session as discussed above, and also determines that the modified lead packet 1402 is a modified lead packet containing session metadata. Therefore, Node B determines that it is not the first waypoint AIPR for the session.

Node B stores 5-tuple information from the received modified lead packet 1402 as the Return Association (RA) for Session X. This is represented in FIG. 16 as "Return Association" information.

In order to forward a modified lead packet (i.e., Modified Lead Packet 1403) over an outgoing interface, Node B accesses its routing information base to look up routing information for the original destination address of 5.5.5.5 (e.g., outgoing port and next node information). In this example, Node B identifies Node C as the next waypoint AIPR based on the original destination address of 5.5.5.5 and therefore determines that it is an intermediate waypoint AIPR for the session. Node B stores an indicator so that it will process subsequent packets associated with the session as an intermediate waypoint AIPR. This is represented in FIG. 16 as "Flag =Intermediate Waypoint AIPR." Node B then assigns a source port number and a destination port number for outgoing packets associated with the session (in this example, source port number 50 and destination port number 60) and stores the resulting 5-tuple as the Forward Association (FA) for outgoing packets associated with the session. This is shown in FIG. 16 as "Forward Association" information. Implicitly, Node B's network address of 3.3.3.3 will be the source address for session-related packets forwarded over an outgoing interface.

Node B creates the modified lead packet 1403 using its stored Forward Association information. In this example, the modified lead packet 1403 includes Node B's network address of 3.3.3.3 as the source address (SA), the assigned session source port number (SSP) of 50 as the source port number (SP), Node C's address of 4.4.4.4 as the destination address (DA), the assigned session destination port number (SDP) of 60 as the destination port number (DP), and the received protocol identifier of 100 as the protocol identifier (PR). Node B also includes the original source address (OSA) of 1.1.1.1, the original source port number (OSP) of 10, the original destination address (ODA) of 5.5.5.5, and the original destination port number (ODP) of 20 as metadata in the modified lead packet 1403 (i.e., Node B forwards the metadata that it received in modified lead packet 1402). This information is shown in parentheses in order to represent that it is metadata that has been added to the lead packet. Node B forwards the modified lead packet 1403 to Node C.

The modified lead packet 1403 reaches Node C, which identifies the modified lead packet 1403 as a lead packet for a new session as discussed above, and also determines that the modified lead packet 1403 is a modified lead packet containing session metadata. Therefore, Node C determines that it is not the first waypoint AIPR for the session.

Node C stores 5-tuple information from the received modified lead packet 1403 as the Return Association (RA) for Session X. This is represented in FIG. 17 as "Return Association" information.

In order to forward a modified lead packet (i.e., Modified Lead Packet 1404) over an outgoing interface, Node C accesses its routing information base to look up routing information for the original destination address of 5.5.5.5 (e.g., outgoing port and next node information). In this example, Node C determines that there is no next node and therefore determines that it is the final waypoint AIPR based on the original destination address of 5.5.5.5. Node C stores an indicator so that it will process subsequent packets associated with the session as a final waypoint AIPR. This is represented in FIG. 17 as "Flag=Final Waypoint AIPR." Node C then stores the original 5-tuple information as the Forward Association (FA) for outgoing packets associated with the session. This is shown in FIG. 17 as "Forward Association" information.

Node C creates the modified lead packet 1404 using its stored Forward Association information. In this example, the modified lead packet 1404 includes the original source address of 1.1.1.1 as the source address (SA), the original source port number (SSP) of 10 as the source port number (SP), the original destination device address of 5.5.5.5 as the destination address (DA), the original destination port number of 20 as the destination port number (DP), and the received/original protocol identifier of 100 as the protocol identifier (PR).

The modified lead packet 1404 reaches the destination device, which processes the modified lead packet 1404. Typically, this includes the destination device sending a reply packet back toward the source device.

It should be noted that each node can store information for multiple sessions. For example, FIGS. 15-17 schematically show information stored for additional Sessions Y and Z. As for Session X, the information stored for Sessions Y and Z includes Return Association (RA) information, Forward Association (FA) information, and a Flag. It should be noted that the nodes may have different roles in different sessions, e.g., whereas Node A is the first waypoint AIPR and Node C is the final waypoint AIPR in the example of FIG. 14, Node A could be the final waypoint AIPR for Session Y and could be an intermediate waypoint AIPR for Session Z.

After the lead packet has been processed and the session-related information has been established by the waypoint AIPRs hop-by-hop from the source device to the destination device, additional packets may be exchanged between the source device and the destination device in order to establish an end-to-end communication session between the source device and the destination device.

FIG. 18 is a schematic diagram providing an example of session packet processing for an example packet sent from the source device to the destination device through the AIPR devices for the session established in FIG. 14.

Here, the source device sends a session packet 1801 having a source address (SA) of 1.1.1.1; a source port number of 10 (i.e., the original SP); a destination address of 5.5.5.5; a destination port number of 20 (i.e., the original DP); and a protocol identifier of 100. Because Node A is the default router/gateway for source 1.1.1.1, the session packet 1801 is routed by the network to Node A.

Based on the 5-tuple information contained in the received session packet 1801 and the Return Association stored in memory by Node A, Node A is able to determine that the received session packet 1801 is associated with Session X. Node A forwards the packet according to the Forward Association information associated with Session X as shown in FIG. 15. Specifically, the forwarded session packet 1802 transmitted by Node A has a source address (SA) of 2.2.2.2; a source port number of 30 (i.e., the SSP assigned by Node A); a destination address of 3.3.3.3; a destination port number of 40 (i.e., the SDP assigned by Node A); and a protocol identifier of 100.

Since the forwarded session packet 1802 has a destination address of 3.3.3.3 (i.e., Node B's network address), the session packet 1802 is routed to Node B. Based on the 5-tuple information contained in the received session packet 1802 and the Return Association stored in memory by Node B, Node B is able to determine that the received session packet 1802 is associated with Session X. Node B forwards the packet according to the Forward Association information associated with Session X as shown in FIG. 16. Specifically, the forwarded session packet 1803 transmitted by Node B has a source address (SA) of 3.3.3.3; a source port number of 50 (i.e., the SSP assigned by Node B); a destination address of 4.4.4.4; a destination port number of 60 (i.e., the SDP assigned by Node B); and a protocol identifier of 100.

Since the forwarded session packet 1803 has a destination address of 4.4.4.4 (i.e., Node C's network address), the session packet 1803 is routed to Node C. Based on the 5-tuple information contained in the received session packet 1803 and the Return Association stored in memory by Node C, Node C is able to determine that the received session packet 1803 is associated with Session X. Node C forwards the packet according to the Forward Association information associated with Session X as shown in FIG. 17. Specifically, the forwarded session packet 1804 transmitted by Node C has a source address (SA) of 1.1.1.1 (i.e., the original source address); a source port number of 10 (i.e., the original SP); a destination address of 5.5.5.5 (i.e., the original destination address); a destination port number of 20 (i.e., the original DP); and a protocol identifier of 100.

Since the forwarded session packet 1804 has a destination address of 5.5.5.5 (i.e., the destination device's network address), the forwarded session packet 1804 is routed to the destination device, which processes the packet.

FIG. 19 is a schematic diagram providing an example of session packet processing for a return packet sent by the destination device to the source device through the AIPR devices for the session established in FIG. 14.

Here, the destination device sends a return packet 1901 having a source address (SA) of 5.5.5.5; a source port number of 20 (i.e., the original DP); a destination address of 1.1.1.1 (i.e., the original source address); a destination port number of 10 (i.e., the original SP); and a protocol identifier of 100. In this example, Node C is the default router/gateway for destination 5.5.5.5, so the return packet 1901 is routed by the network to Node C.

Based on the 5-tuple information contained in the received return packet 1901 and the Forward Association stored in memory by Node C, Node C is able to determine that the received return packet 1901 is associated with Session X. Node C forwards the packet according to the Return Association information associated with Session X as shown in FIG. 17. Specifically, the forwarded return packet 1902 transmitted by Node C has a source address (SA) of 4.4.4.4; a source port number of 60 (i.e., the SDP assigned by Node B); a destination address of 3.3.3.3; a destination port number of 50 (i.e., the SSP assigned by Node B); and a protocol identifier of 100.

Since the forwarded return packet 1902 has a destination address of 3.3.3.3 (i.e., Node B's network address), the return packet 1902 is routed to Node B. Based on the 5-tuple information contained in the received return packet 1902 and the Forward Association stored in memory by Node B, Node B is able to determine that the received return packet 1902 is associated with Session X. Node B forwards the packet according to the Return Association information associated with Session X as shown in FIG. 16. Specifically, the forwarded return packet 1903 transmitted by Node B has a source address (SA) of 3.3.3.3; a source port number of 40 (i.e., the SDP assigned by Node A); a destination address of 2.2.2.2; a destination port number of 30 (i.e., the SSP assigned by Node A); and a protocol identifier of 100.

Since the forwarded return packet 1903 has a destination address of 2.2.2.2 (i.e., Node A's network address), the return packet 1903 is routed to Node A. Based on the 5-tuple information contained in the received return packet 1903 and the Forward Association stored in memory by Node A, Node A is able to determine that the received return packet 1903 is associated with Session X. Node A forwards the packet according to the Return Association information associated with Session X as shown in FIG. 15. Specifically, the forwarded return packet 1904 transmitted by Node A has a source address (SA) of 5.5.5.5; a source port number of 20 (i.e., the original DP); a destination address of 1.1.1.1; a destination port number of 10 (i.e., the original SP); and a protocol identifier of 100.

Since the forwarded return packet 1904 has a destination address of 1.1.1.1 (i.e., the source device's network address), the forwarded return packet 1904 is routed to the source device, which processes the packet.

It should be noted that an AIPR can assign source and destination port numbers in any of a variety of ways (e.g., sequentially, non-sequentially, randomly).

Figure 20:
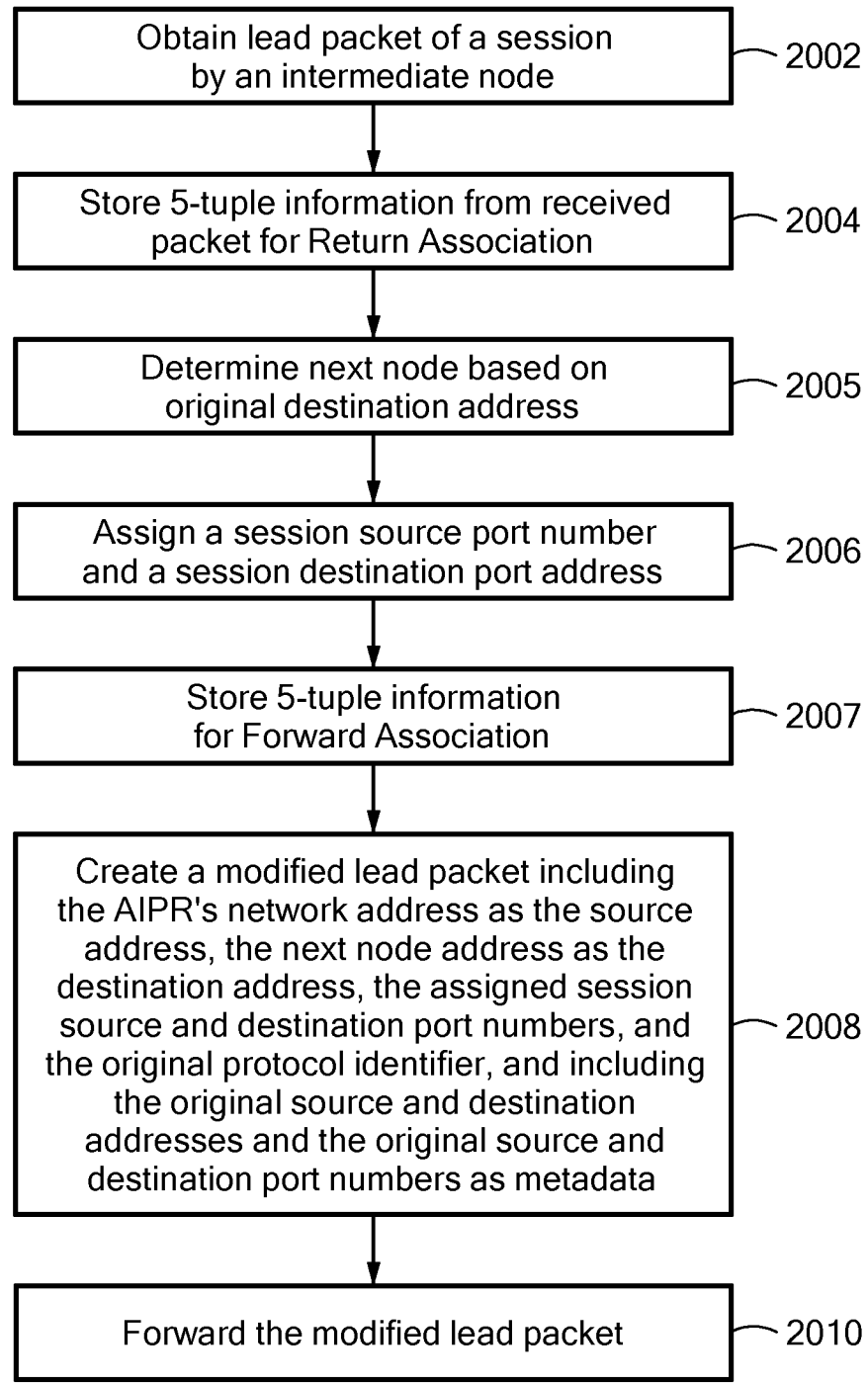
FIG. 20 contains a flowchart schematically illustrating some lead packet processing operations performed by an AIPR in accordance with certain illustrative embodiments of the invention.

FIG. 20 contains a flowchart 2000 schematically illustrating some lead packet processing operations performed by an intermediate AIPR in accordance with certain illustrative embodiments of the invention.

In block 2002, an intermediate AIPR obtains the lead packet of a session. In block 2004, the AIPR stores 5-tuple information from the received packet as Return Association information for the session.

In block 2005, the AIPR determines the next waypoint AIPR based on the original destination address. This typically involves accessing the AIPR's routing information base from which the AIPR can determine the outgoing port and next waypoint AIPR (if any) for the original destination address.

In block 2006, the AIPR assigns a session source port number and a session destination port number.

In block 2007, the AIPR stores 5-tuple information for a Forward Association. The Forward Association includes the AIPR's network address as the source address, the next node address as the destination address, the assigned session source and destination port numbers, and the original protocol identifier.

In block 2008, the AIPR creates a modified lead packet including the AIPR network address as the source address, the next node address as the destination address, the assigned session source and destination port numbers, and the original protocol identifier, and also including the original source and destination addresses and the original source and destination port numbers as metadata. In block 2010, the AIPR forwards the modified lead packet.

It should be noted that the flowchart of FIG. 20 applies to intermediate AIPRs other than the final waypoint AIPR, which performs slightly different processing as discussed above (e.g., the final waypoint AIPR uses the original source address, original source port number, original destination address, and original destination port number contained in the metadata of the received packet for its Forward Association information).

Figure 21:
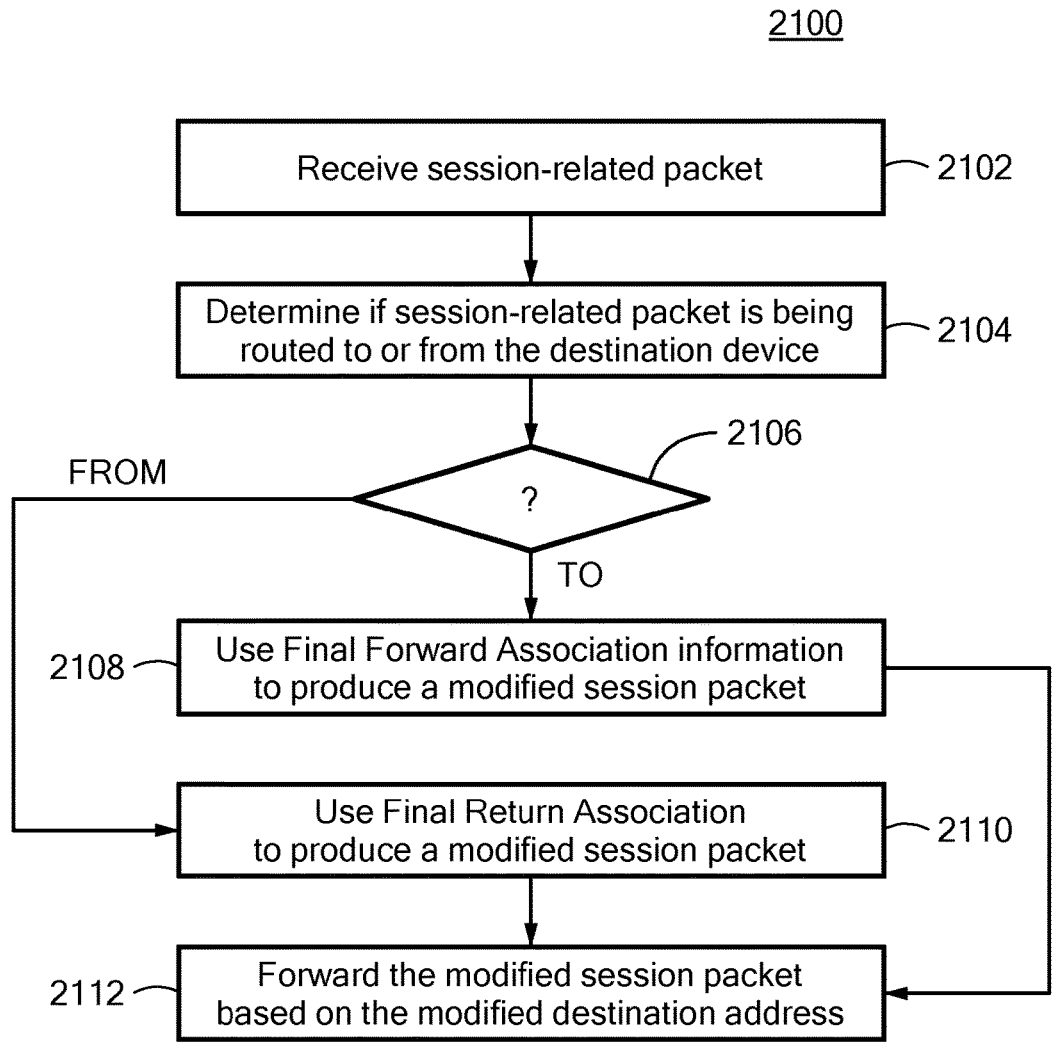
FIG. 21 contains a flowchart 2100 schematically illustrating some packet processing operations performed by an AIPR in accordance with certain illustrative embodiments of the invention.

FIG. 21 contains a flowchart 2100 schematically illustrating some packet processing operations performed by an AIPR in accordance with certain illustrative embodiments of the invention. In block 2102, the AIPR receives a session-related packet. In block 2104, the AIPR determines if the session-related packet is being routed to or from the destination device. If the session-related packet is being routed to the destination device in block 2106, then the AIPR uses the Final Forward Association information to produce a modified session packet, in block 2108. If, however, the session-related packet is being routed from the destination device in block 2106, then the AIPR uses the Final Return Association information to produce a modified session packet, in block 2110. In either case, the AIPR forwards the modified session packet based on the modified destination address, in block 2112.

Figure 22:
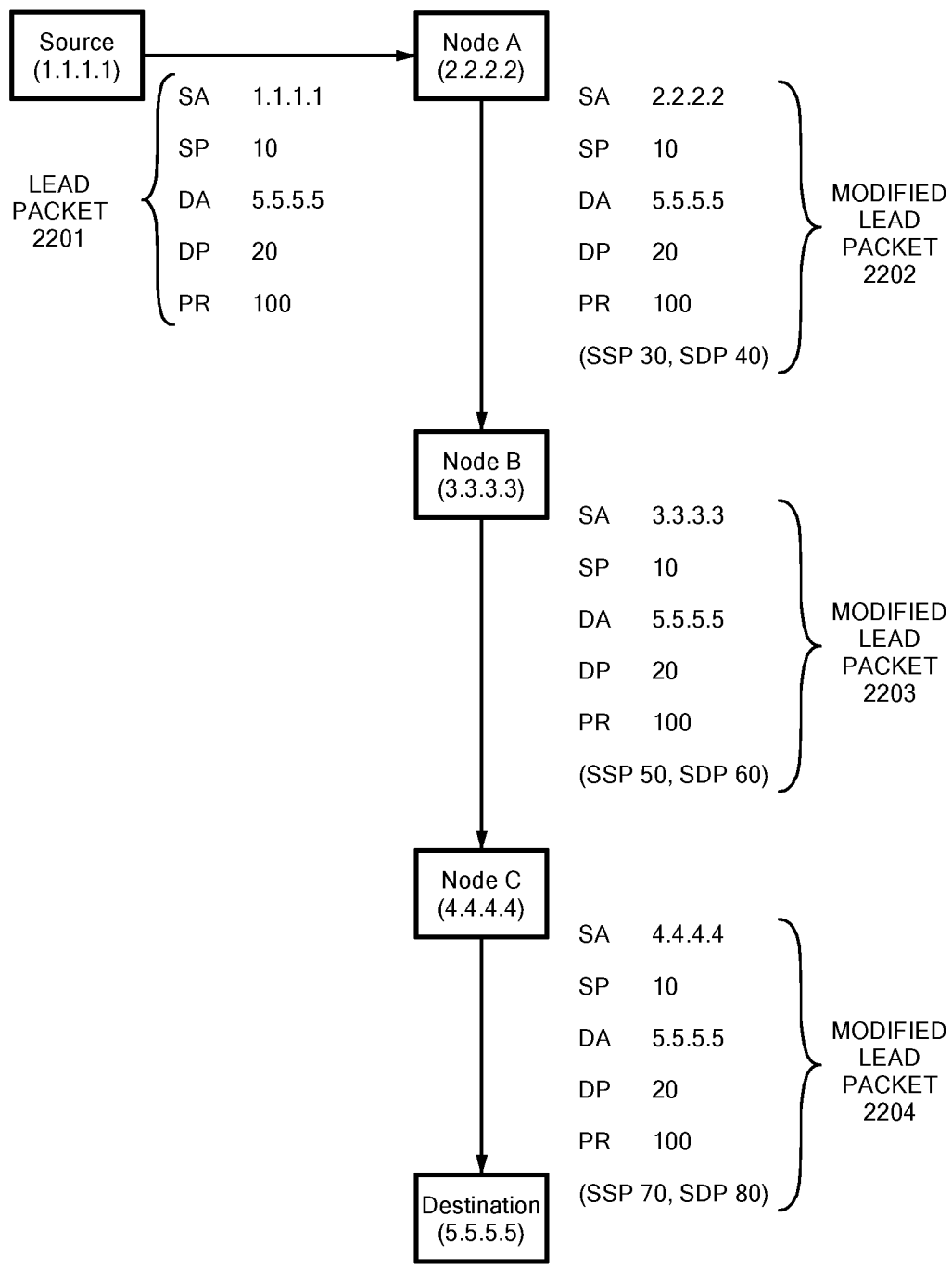
FIG. 22 is a schematic diagram providing an example of lead packet processing from a source device to a destination device through three AIPR devices, in accordance with certain alternative embodiments of the present invention.
Figure 26:
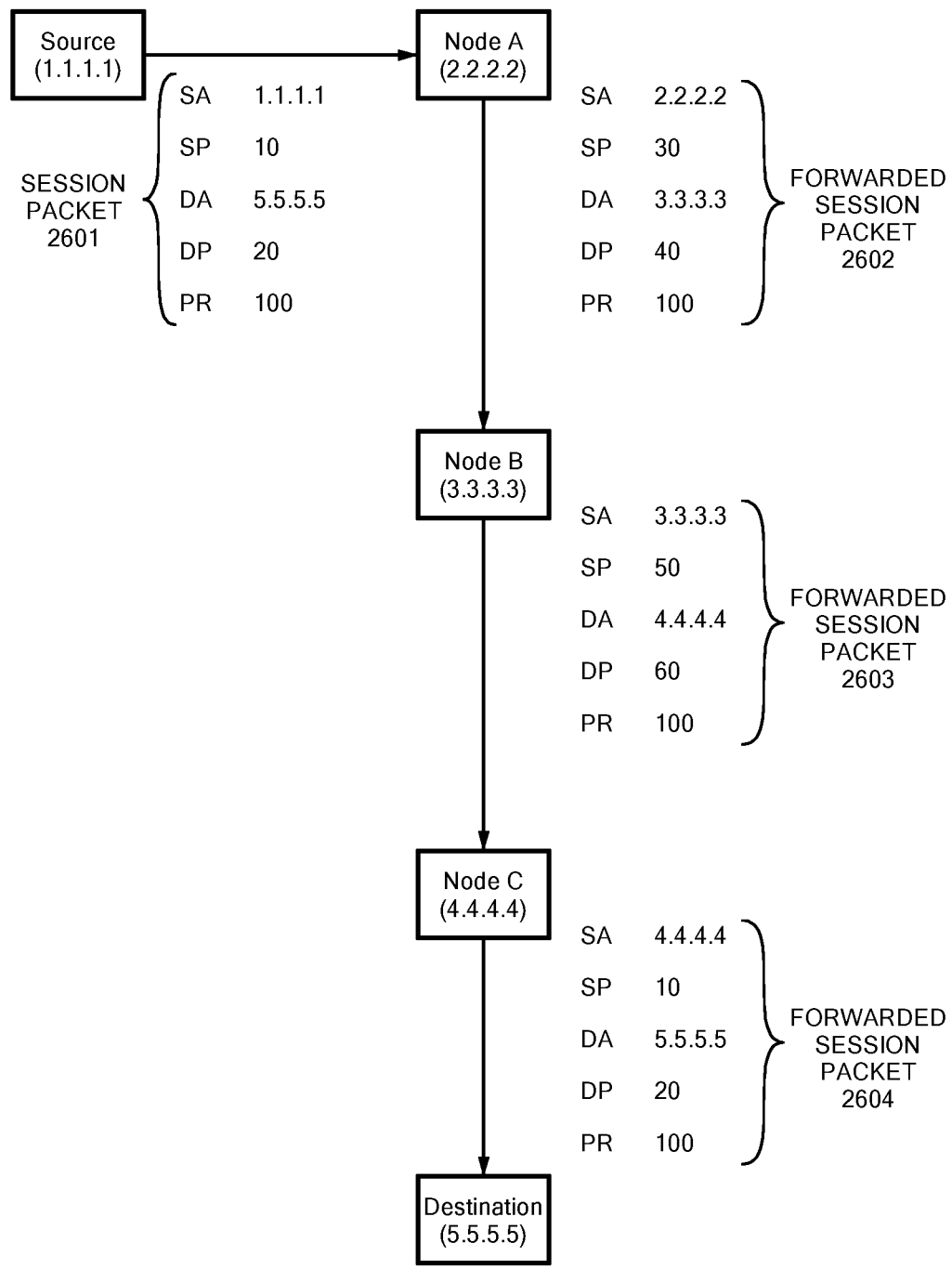
FIG. 26 is a schematic diagram providing an example of session packet processing for an example packet sent from the source device to the destination device through the AIPR devices for the session established in FIG. 22.
Figure 27:
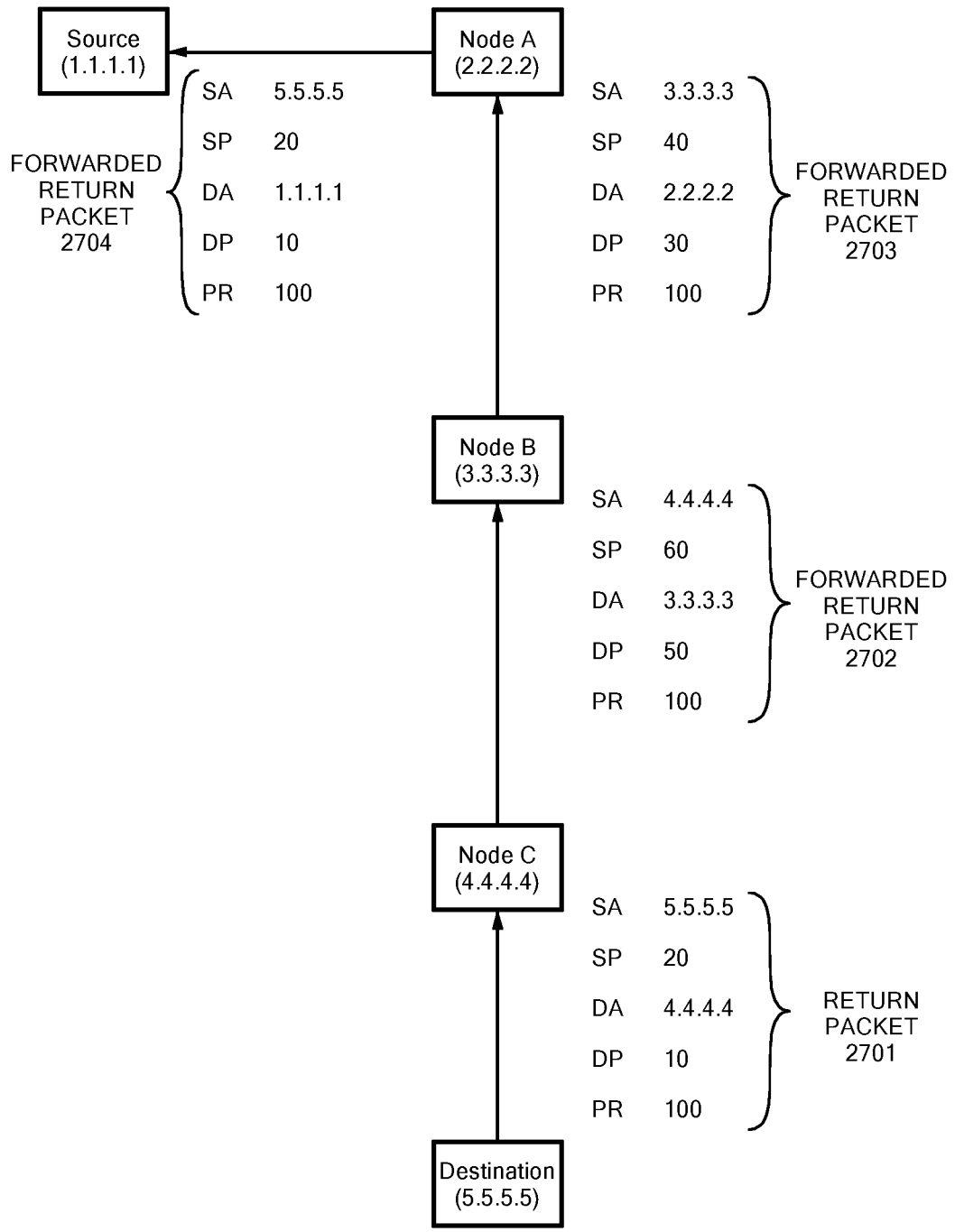
FIG. 27 is a schematic diagram providing an example of session packet processing for a return packet sent by the destination device to the source device through the AIPR devices for the session established in FIG. 22.

An alternative technique for extended session management based on a combination of source port number and destination port number is now demonstrated by example with reference to FIGS. 22-27. Specifically, FIG. 22 is a schematic diagram providing an example of lead packet processing from a source device to a destination device through three AIPR devices (referred to as "Node A," "Node B," and "Node C"), where the source device has network address 1.1.1.1; Node A has network address 2.2.2.2; Node B has network address 3.3.3.3; Node C has network address 4.4.4.4; and the destination device has network address 5.5.5.5. FIG. 23 is a schematic diagram showing session-related data associated with Node A based on the lead packet processing of FIG. 22. FIG. 24 is a schematic diagram showing session-related data associated with Node B based on the lead packet processing of FIG. 22. FIG. 25 is a schematic diagram showing session-related data associated with Node C based on the lead packet processing of FIG. 22. FIG. 26 is a schematic diagram providing an example of session packet processing for an example packet sent from the source device to the destination device through the AIPR devices for the session established in FIG. 22. FIG. 27 is a schematic diagram providing an example of session packet processing for a return packet sent by the destination device to the source device through the AIPR devices for the session established in FIGS. 22.

In the following exemplary embodiments, each AIPR is presumed not to have a priori knowledge of the other AIPRs in the network in relation to the network/next hop associations contained in its routing information base, such that, for example, a particular AIPR does not know the next waypoint AIPR (if any) to use for the destination network address. Rather, in these examples, each waypoint AIPR learns of the presence or absence of a next waypoint AIPR after forwarding the modified lead packet.

With reference again to FIG. 22, the source device sends a lead packet 2201 with a source address (SA) of 1.1.1.1; a source port number (SP) of 10; a destination address (DA) of 5.5.5.5; a destination port number (DP) of 20; and a protocol identifier (PR) of 100.

In this example, Node A is the default router/gateway for source 1.1.1.1, so the lead packet 2201 is routed to Node A, which identifies the lead packet 2201 as the lead packet for a new session as discussed above, and also determines that the lead packet 2201 is not a modified lead packet containing session metadata. Therefore, Node A determines that it is the first waypoint AIPR for the session and stores an indicator so that it will process subsequent packets associated with the session as the first waypoint AIPR. This is represented in FIG. 23 as "Flag =First Waypoint AIPR."

Node A stores information from the received lead packet 2201, such as the source address, the source port number, the destination port number, and the protocol identifier. This is represented in FIG. 23 as "Lead Packet Information." For convenience, the source address, source port number, destination address, destination port number, and protocol identifier information associated with a particular session is referred to in FIGS. 23-25 as session source address (SSA), session source port number (SSP), session destination address (SDA), session destination port number (SDP), and session protocol identifier (SPR), respectively.

Since Node A is the first waypoint AIPR, Node A is able to determine that future session-related packets received from the source device will have a source address (SA) of 1.1.1.1; a source port number of 10; a destination address of 5.5.5.5; a destination port number of 20; and a protocol identifier of 100. This is shown in FIG. 23 as "Final Return Association" information.

In order to forward a modified lead packet (i.e., Modified Lead Packet 2202) over an outgoing interface, Node A assigns a source port number and a destination port number for outgoing packets associated with the session (in this example, source port number 30 and destination port number 40) and stores the assigned source and destination port numbers along with other session identifier information for outgoing packets associated with the session. This is shown in FIG. 23 as "Lead Forward Association" information. Implicitly, Node A's network address of 2.2.2.2 will be the source address for session-related packets forwarded over an outgoing interface. At this point, Node A does not know the destination address that will be used for session-related packets forwarded over an outgoing interface (since Node A does not determine until later whether or not it is the final waypoint AIPR between the source device and the destination device).

Node A creates the modified lead packet 2202 using its own network address of 2.2.2.2 as the source address (SA), the received source port number of 10 as the source port number (SP), the received destination address of 5.5.5.5 as the destination address (DA), the received destination port number of 20 as the destination port number (DP), and the received protocol identifier of 100 as the protocol identifier (PR). Node A also includes the assigned session source port number (SSP) of 30 and the assigned session destination port number (SDP) of 40 as metadata in the modified lead packet 2202. This information is shown in parentheses in order to represent that it is metadata that has been added to the lead packet. Node A forwards the modified lead packet 2202 based on the destination address of 5.5.5.5.

The modified lead packet 2202 reaches Node B, which identifies the modified lead packet 2202 as a lead packet for a new session as discussed above, and also determines that the modified lead packet 2202 is a modified lead packet containing session metadata. Therefore, Node B determines that it is not the first waypoint AIPR for the session. At this time, Node B is unable to determine whether or not it is the final waypoint AIPR for the session. In this example, Node B later determines that it is not the final waypoint AIPR for the session and stores an indicator so that it will process subsequent packets associated with the session as an intermediate waypoint AIPR. This is represented in FIG. 24 as "Flag=Intermediate Waypoint AIPR."

Node B stores information from the received modified lead packet 2202, such as the source address, the source port number, the destination port number, and the protocol identifier. This is represented in FIG. 24 as "Lead Packet Information."

Since Node B is not the first waypoint AIPR, Node B is able to determine that future session-related packets received from Node A will have a source address (SA) of 2.2.2.2; a source port number of 30 (i.e., the SSP assigned by Node A); destination address of 3.3.3.3; a destination port number of 40 (i.e., the SDP assigned by Node A); and a protocol identifier of 100. This is shown in FIG. 24 as "Final Return Association" information.

In order to forward a modified lead packet (i.e., Modified Lead Packet 2203) over an outgoing interface, Node B assigns a source port number and a destination port number for outgoing packets associated with the session (in this example, source port number 50 and destination port number 60) and stores the assigned source and destination port numbers along with other session identifier information for outgoing packets associated with the session. This is shown in FIG. 24 as "Lead Forward Association" information. Implicitly, Node B's network address of 3.3.3.3 will be the source address for session-related packets forwarded over an outgoing interface. At this point, Node B does not know the destination address that will be used for session-related packets forwarded over an outgoing interface (since Node B does not determine until later whether or not it is the final waypoint AIPR between the source device and the destination device).

Node B creates the modified lead packet 2203 using its own network address of 3.3.3.3 as the source address (SA), the received source port number of 10 as the source port number (SP), the received destination address of 5.5.5.5 as the destination address (DA), the received destination port number of 20 as the destination port number (DP), and the received protocol identifier of 100 as the protocol identifier (PR). Node B also includes the assigned session source port number (SSP) of 50 and the assigned session destination port number (SDP) of 60 as metadata in the modified lead packet 2203. This information is shown in parentheses in order to represent that it is metadata that has been added to the lead packet. Node B forwards the modified lead packet 2203 based on the destination address of 5.5.5.5.

As discussed above, at some point, Node B identifies itself to Node A as a waypoint AIPR for the session (e.g., upon receipt of the modified lead packet 1402 or in a return packet associated with the session). This allows Node A to determine that it is not the final waypoint AIPR and therefore also allows Node A to determine the forward association parameters to use for forwarding session-related packets, i.e., Node A is able to determine that future session-related packets sent to Node B will have a source address (SA) of 2.2.2.2; a source port number of 30 (i.e., the SSP assigned by Node A); destination address of 3.3.3.3; a destination port number of 40 (i.e., the SDP assigned by Node A); and a protocol identifier of 100. This is shown in FIG. 23 as "Final Forward Association" information.

The modified lead packet 2203 reaches Node C, which identifies the modified lead packet 2203 as a lead packet for a new session as discussed above, and also determines that the modified lead packet 2203 is a modified lead packet containing session metadata. Therefore, Node C determines that it is not the first waypoint AIPR for the session. At this time, Node C is unable to determine whether or not it is the final waypoint AIPR for the session. In this example, Node C later determines that it is the final waypoint AIPR for the session and stores an indicator so that it will process subsequent packets associated with the session as an intermediate waypoint AIPR. This is represented in FIG. 25 as "Flag=Final Waypoint AIPR."

Node C stores information from the received modified lead packet 2203, such as the source address, the source port number, the destination port number, and the protocol identifier. This is represented in FIG. 25 as "Lead Packet Information."

Since Node C is not the first waypoint AIPR, Node C is able to determine that future session-related packets received from Node B will have a source address (SA) of 3.3.3.3; a source port number of 50 (i.e., the SSP assigned by Node B); destination address of 4.4.4.4; a destination port number of 60 (i.e., the SDP assigned by Node B); and a protocol identifier of 100. This is shown in FIG. 25 as "Final Return Association" information.

In order to forward a modified lead packet (i.e., Modified Lead Packet 2204) over an outgoing interface, Node C assigns a source port number and a destination port number for outgoing packets associated with the session (in this example, source port number 70 and destination port number 80) and stores the assigned source and destination port numbers along with other session identifier information for outgoing packets associated with the session. This is shown in FIG. 25 as "Lead Forward Association" information. Implicitly, Node C's network address of 4.4.4.4 will be the source address for session-related packets forwarded over an outgoing interface. At this point, Node C does not know the destination address that will be used for session-related packets forwarded over an outgoing interface (since Node C does not determine until later whether or not it is the final waypoint AIPR between the source device and the destination device).

Node C creates the modified lead packet 2204 using its own network address of 4.4.4.4 as the source address (SA), the received source port number of 10 as the source port number (SP), the received destination address of 5.5.5.5 as the destination address (DA), the received destination port number of 20 as the destination port number (DP), and the received protocol identifier of 100 as the protocol identifier (PR). Node C also includes the assigned session source port number (SSP) of 70 and the assigned session destination port number (SDP) of 80 as metadata in the modified lead packet 2204. This information is shown in parentheses in order to represent that it is metadata that has been added to the lead packet. Node C forwards the modified lead packet 2203 based on the destination address of 5.5.5.5.

As discussed above, at some point, Node C identifies itself to Node B as a waypoint AIPR for the session (e.g., upon receipt of the modified lead packet 2203 or in a return packet associated with the session). This allows Node B to determine that it is not the final waypoint AIPR and therefore also allows Node B to determine the forward association parameters to use for forwarding session-related packets, i.e., Node B is able to determine that future session-related packets sent to Node C will have a source address (SA) of 3.3.3.3; a source port number of 50 (i.e., the SSP assigned by Node B); destination address of 4.4.4.4; a destination port number of 60 (i.e., the SDP assigned by Node B); and a protocol identifier of 100. This is shown in FIG. 24 as "Final Forward Association" information.

The modified lead packet 2204 reaches the destination device, which processes the modified lead packet 2204 without reference to the session metadata contained in the packet. Typically, this includes the destination device sending a reply packet back to the source device.

Since Node C receives a packet from the destination device, as opposed to another waypoint AIPR, Node C is able to determine that it is the final waypoint AIPR and therefore also is able to determine the forward association parameters to use for forwarding session-related packets, i.e., Node C is able to determine that future session-related packets sent to the destination device will have a source address (SA) of 4.4.4.4; a source port number of 10 (i.e., the original SP); a destination address of 5.5.5.5; a destination port number of 20 (i.e., the original DP); and a protocol identifier of 100. This is shown in FIG. 25 as "Final Forward Association" information.

After the lead packet has been processed and the session-related information has been established by the waypoint AIPRs hop-by-hop from the source device to the destination device, additional packets may be exchanged between the source device and the destination device in order to establish an end-to-end communication session between the source device and the destination device.

FIG. 26 is a schematic diagram providing an example of session packet processing for an example packet sent from the source device to the destination device through the AIPR devices for the session established in FIG. 22.

Here, the source device sends a session packet 2601 having a source address (SA) of 1.1.1.1; a source port number of 10 (i.e., the original SP); a destination address of 5.5.5.5; a destination port number of 20 (i.e., the original DP); and a protocol identifier of 100.

Because Node A is the default router/gateway for source 1.1.1.1, session packet 2601 is routed to Node A. Node A forwards the packet according to the Final Forward Association information shown in FIG. 23. Specifically, the forwarded session packet 2602 transmitted by Node A has a source address (SA) of 2.2.2.2; a source port number of 30 (i.e., the SSP assigned by Node A); a destination address of 3.3.3.3; a destination port number of 40 (i.e., the SDP assigned by Node A); and a protocol identifier of 100.

Since the forwarded session packet 2602 has a destination address of 3.3.3.3 (i.e., Node B's network address), the session packet 2602 is routed to Node B. Node B forwards the packet according to the Final Forward Association information shown in FIG. 24. Specifically, the forwarded session packet 1803 transmitted by Node B has a source address (SA) of 3.3.3.3; a source port number of 50 (i.e., the SSP assigned by Node B); a destination address of 4.4.4.4; a destination port number of 60 (i.e., the SDP assigned by Node B); and a protocol identifier of 100.

Since the forwarded session packet 2603 has a destination address of 4.4.4.4 (i.e., Node C's network address), the session packet 2603 is routed to Node C. Node C forwards the packet according to the Final Forward Association information shown in FIG. 25. Specifically, the forwarded session packet 2604 transmitted by Node C has a source address (SA) of 4.4.4.4; a source port number of 10 (i.e., the original SP); a destination address of 5.5.5.5; a destination port number of 20 (i.e., the original DP); and a protocol identifier of 100.

Since the forwarded session packet 2604 has a destination address of 5.5.5.5 (i.e., the destination device's network address), the forwarded session packet 2604 is routed to the destination device, which processes the packet.

FIG. 27 is a schematic diagram providing an example of session packet processing for a return packet sent by the destination device to the source device through the AIPR devices for the session established in FIG. 22.

Here, the destination device sends a return packet 2701 having a source address (SA) of 5.5.5.5; a source port number of 20 (i.e., the original DP); a destination address of 4.4.4.4; a destination port number of 10 (i.e., the original SP); and a protocol identifier of 100.

Since the return packet 2701 has a destination address of 4.4.4.4 (i.e., Node C's network address), the return packet 2701 is routed to Node C. Node C forwards the packet according to the Final Return Association information shown in FIG. 25. Specifically, the forwarded return packet 2702 transmitted by Node C has a source address (SA) of 4.4.4.4; a source port number of 60 (i.e., the SDP assigned by Node B); a destination address of 3.3.3.3; a destination port number of 50 (i.e., the SSP assigned by Node B); and a protocol identifier of 100.

Since the forwarded return packet 2702 has a destination address of 3.3.3.3 (i.e., Node B's network address), the return packet 2702 is routed to Node B. Node B forwards the packet according to the Final Return Association information shown in FIG. 24. Specifically, the forwarded return packet 2703 transmitted by Node B has a source address of 3.3.3.3; a source port number of 40 (i.e., the SDP assigned by Node A); a destination address of 2.2.2.2; a destination port number of 30 (i.e., the SSP assigned by Node A); and a protocol identifier of 100.

Since the forwarded return packet 2703 has a destination address of 2.2.2.2 (i.e., Node A's network address), the return packet 2703 is routed to Node A. Node A forwards the packet according to the Final Return Association information shown in FIG. 23. Specifically, the forwarded return packet 2704 transmitted by Node A has a source address of 5.5.5.5; a source port number of 20 (i.e., the original DP); a destination address of 1.1.1.1; a destination port number of 10 (i.e., the original SP); and a protocol identifier of 100.

Since the forwarded return packet 2704 has a destination address of 1.1.1.1 (i.e., the source device's network address), the forwarded return packet 2704 is routed to the source device, which processes the packet.

It should be noted that an AIPR can assign source and destination port numbers in any of a variety of ways (e.g., sequentially or non-sequentially), as the assigned port numbers are used "internally" by the waypoint AIPRs, with the final waypoint AIPR forwarding packets that contain the original destination address and the original destination port number.

Figure 28:
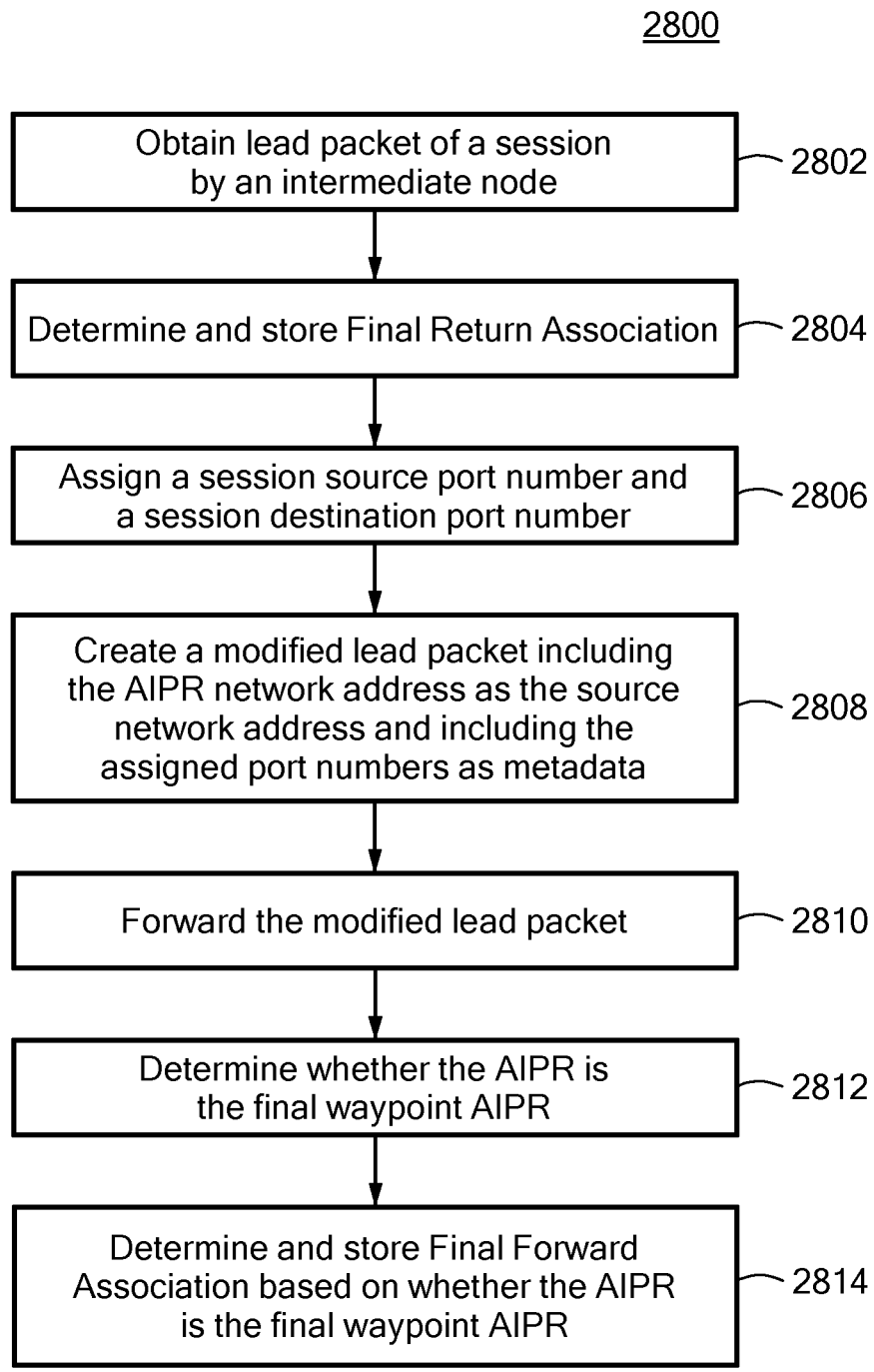
FIG. 28 contains a flowchart schematically illustrating some lead packet processing operations performed by an AIPR in accordance with certain alternative embodiments of the invention.

FIG. 28 contains a flowchart 2800 schematically illustrating some lead packet processing operations performed by an AIPR in accordance with certain illustrative embodiments of the invention.

In block 2802, the AIPR obtains the lead packet of a session. In block 2804, the AIPR determines and stores Final Return Association information for the session. If the lead packet is not a modified lead packet (i.e., the AIPR is the first waypoint AIPR), then the Final Return Association information includes the source network address, destination network address, source port number, and destination port number from the received packet. If, however, the lead packet is a modified lead packet (i.e., the AIPR is not the first waypoint AIPR), then the Final Return Association information includes the source network address from the packet and includes the session source port number and the session destination port number from the packet metadata, which was inserted by a predecessor waypoint AIPR.

In block 2806, the AIPR assigns a session source port number and a session destination port number for a possible forward association. In block 2808, the AIPR creates a modified lead packet including the AIPR network address as the source network address and including the assigned port numbers as metadata. In block 2810, the AIPR forwards the modified lead packet.

In block 2812, the AIPR determines whether the AIPR is the final waypoint AIPR, and then in block 2814, the AIPR determines and stores Final Forward Association information for the session based on the determination of whether the AIPR is the final waypoint AIPR. If the AIPR receives a return packet or other indication from a next waypoint AIPR, then the AIPR determines that it is not the final waypoint AIPR, in which case the Final Forward Association includes the network address of the successor AIPR as the destination address for the session and also includes the assigned session source and destination port numbers. If, however, the AIPR receives a return packet from the destination device, then the AIPR determines that it is the final waypoint AIPR, in which case the Final Forward Association information includes the network address of the destination device as the destination device for the session and also includes the original source and destination port numbers.

Packet processing operations are performed by an AIPR in accordance with the flowchart shown in FIG. 21.

As discussed above, the AIPR and all or a portion of its components may be implemented by a processor executing instructions stored in a memory, hardware (such as combinatorial logic, Application Specific Integrated Circuits (ASICs), Field-Programmable Gate Arrays (FPGAs) or other hardware), firmware or combinations thereof.

While the invention is described through the above-described exemplary embodiments, modifications to, and variations of, the illustrated embodiments may be made without departing from the inventive concepts disclosed herein. Furthermore, disclosed aspects, or portions thereof, may be combined in ways not listed above and/or not explicitly claimed. Accordingly, the invention should not be viewed as being limited to the disclosed embodiments.

Although aspects of embodiments may be described with reference to flowcharts and/or block diagrams, functions, operations, decisions, etc. of all or a portion of each block, or a combination of blocks, may be combined, separated into separate operations or performed in other orders. All or a portion of each block, or a combination of blocks, may be implemented as computer program instructions (such as software), hardware (such as combinatorial logic, Application Specific Integrated Circuits (ASICs), Field-Programmable Gate Arrays (FPGAs) or other hardware), firmware or combinations thereof. Embodiments may be implemented by a processor executing, or controlled by, instructions stored in a memory. The memory may be random access memory (RAM), read-only memory (ROM), flash memory or any other memory, or combination thereof, suitable for storing control software or other instructions and data. Instructions defining the functions of the present invention may be delivered to a processor in many forms, including, but not limited to, information permanently stored on tangible non-writable storage media (e.g., read-only memory devices within a computer, such as ROM, or devices readable by a computer I/O attachment, such as CD-ROM or DVD disks), information alterably stored on tangible writable storage media (e.g., floppy disks, removable flash memory and hard drives) or information conveyed to a computer through a communication medium, including wired or wireless computer networks. Moreover, while embodiments may be described in connection with various illustrative data structures, systems may be embodied using a variety of data structures.

Miscellaneous

It should be noted that headings are used above for convenience and are not to be construed as limiting the present invention in any way.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as a pre-configured, stand-along hardware element and/or as preprogrammed hardware elements (e.g., application specific integrated circuits, FPGAs, and digital signal processors), or other related components.

In an alternative embodiment, the disclosed apparatus and methods (e.g., see the various flow charts described above) may be implemented as a computer program product for use with a computer system. Such implementation may include a series of computer instructions fixed either on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

Various embodiments of the present invention may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public.

Without limitation, potential subject matter that may be claimed (prefaced with the letter "P" so as to avoid confusion with the actual claims presented below) includes:

P1. A packet routing method for directing packets of a session from an originating node toward a destination node in an IP network, the method comprising:

an intermediate node obtaining a lead packet of a plurality of packets in a session, the intermediate node having an intermediate node identifier;

assigning a source port number and a destination port number for the session;

modifying the lead packet to include the intermediate node identifier and the assigned source and destination port numbers;

forwarding the modified lead packet toward the destination node though an intermediate node electronic output interface to the IP network, the electronic output interface being in communication with the IP network;

receiving, through an electronic input interface of the intermediate node, a backward message from a next node, the next node having a next node identifier, the backward message including the next node identifier, the electronic input interface being in communication with the IP network;

forming a forward association between the intermediate node identifier, the next node identifier, and the assigned source and destination port numbers;

storing the forward association in a memory;

obtaining additional packets of the session; and forwarding, through the electronic output interface of the intermediate node, substantially all of the additional packets in the session toward the next node using the stored forward association.

P2. The packet routing method as defined by claim P1 wherein forwarding the modified lead packet toward the destination node comprises using an originating node identifier in the lead packet to transmit the modified lead packet toward the next node.

P3. The packet routing method as defined by claim P2 wherein forwarding the modified lead packet toward the destination node comprises accessing a routing information base having routing information for the destination node.

P4. The packet routing method as defined by claim P1 further comprising:

determining a prior node, if any, through which the lead packet traversed, the prior node having a prior node identifier, the lead packet including the prior node identifier and source and destination port numbers assigned by the prior node;

forming a return association between the prior node identifier, the intermediate node identifier, and the source and destination port numbers assigned by the prior node; and storing the return association in the memory.

P5. The packet routing method as defined by claim P4 further comprising:

receiving a plurality of packets in a return session from the destination node, the return session being addressed toward the originating node; and forwarding, through the electronic output interface, substantially all the packets in the return session toward the prior node using the stored return association.

P6. The packet routing method as defined by claim P1 wherein the intermediate node has a routing table, and wherein forwarding the lead packet toward the destination node comprises using the routing table to forward the lead packet toward the destination node.

P7. The packet routing method as defined by claim P1 wherein the intermediate node comprises a routing device or a switching device.

P8. The packet routing method as defined by claim P1 wherein the modified lead packet is addressed so that at least one network device receives the modified lead packet after it is forwarded and before the next node receives the lead packet.

P9. An intermediate routing device for directing packets of a session from an originating node toward a destination node in an IP network, the intermediate routing device having an intermediate node identifier, the routing device comprising: an electronic input interface for receiving IP packets from the IP network;

an electronic output interface for forwarding IP packets on the IP network;

a memory for storing session state information;

a lead packet identifier operatively coupled with the electronic input interface, the lead packet identifier configured to identify a lead packet of a plurality of packets in a session;

a lead packet modifier operatively coupled with the lead packet identifier, the lead packet modifier being configured to assign a source port number and a destination port number for the session and to modify the lead packet to include the intermediate node identifier and the assigned source and destination port numbers;

a router operatively coupled with the electronic output interface, the router being configured to forward the modified lead packet toward the destination node through the electronic output interface; and an associator operatively coupled with the electronic input interface, the associator being configured to: a) receive a backward message from a next node having a next node identifier, the backward message including the next node identifier, b) form a forward association between the intermediate node identifier, the next node identifier, and the assigned source and destination port numbers, and c) store the forward association in the memory, the router also being configured to forward, through the electronic output interface, additional packets in the session toward the next node using the stored forward association.

P10. The intermediate routing device as defined by claim P9 wherein the router is configured to use an originating node identifier in the lead packet to transmit the modified lead packet toward the next node.

P11. The intermediate routing device as defined by claim P10 wherein the router includes a routing information base having routing information for forwarding the lead packet toward the destination node.

P12. The intermediate routing device as defined by claim P9 wherein the associator is further configured to 1) determine a prior node, if any, through which the lead packet traversed, the prior node having a prior node identifier, the lead packet including the prior node identifier and source and destination port numbers assigned by the prior node, 2) form a return association between the prior node identifier, the intermediate node identifier, and the source and destination port numbers assigned by the prior node, and 3) store the return association in the memory.

P13. The intermediate routing device as defined by claim P12 wherein the router is configured to forward, through the electronic output interface, packets in a return session toward the prior node using the stored return association.

P14. The intermediate routing device as defined by claim P9 further comprising a routing table, the router being configured to forward the modified lead packet toward the destination node using the routing table.

P15. A computer program product for use on a computer system for directing packets of a session from an originating node toward a destination node in an IP network, the computer program product comprising a tangible, non-transient computer usable medium having computer readable program code thereon, the computer readable program code comprising:

program code for causing an intermediate node obtaining a lead packet of a plurality of packets in a session, the intermediate node having an intermediate node identifier;

program code for assigning a source port number and a destination port number for the session;

program code for modifying the lead packet to include the intermediate node identifier and the assigned source and destination port numbers;

program code for forwarding the modified lead packet toward the destination node though an intermediate node electronic output interface to the IP network, the electronic output interface being in communication with the IP network;

program code for receiving, through an electronic input interface of the intermediate node, a backward message from a next node, the next node having a next node identifier, the backward message including the next node identifier, the electronic input interface being in communication with the IP network;

program code for forming a forward association between the intermediate node identifier, the next node identifier, and the assigned source and destination port numbers;

program code for storing the forward association in a memory;

program code for obtaining additional packets of the session; and program code for forwarding, through the electronic output interface of the intermediate node, substantially all of the additional packets in the session toward the next node using the stored forward association.

P16. The computer program product as defined by claim P15 wherein the program code for forwarding the modified lead packet toward the destination node comprises program code for using an originating node identifier in the lead packet to transmit the modified lead packet toward the next node.

P17. The computer program product as defined by claim P16 wherein the program code for forwarding the modified lead packet toward the destination node comprises program code for accessing a routing information base having routing information for the destination node.

P18. The computer program product as defined by claim P15 further comprising:

program code for determining a prior node, if any, through which the lead packet traversed, the prior node having a prior node identifier, the lead packet including the prior node identifier and source and destination port numbers assigned by the prior node;

program code for forming a return association between the prior node identifier, the intermediate node identifier, and the source and destination port numbers assigned by the prior node; and program code for storing the return association in the memory.

P19. The computer program product as defined by claim P18 further comprising:

program code for receiving a plurality of packets in a return session from the destination node, the return session being addressed toward the originating node; and program code for forwarding, through the electronic output interface, substantially all the packets in the return session toward the prior node using the stored return association.

P20. The computer program product as defined by claim P15 wherein the intermediate node has a routing table, and wherein the program code for forwarding the modified lead packet toward the destination node comprises program code for using the routing table to forward the lead packet toward the destination node.

P21. The computer program product as defined by claim P15 wherein the intermediate node comprises a routing device or a switching device.

P22. The computer program product as defined by claim P15 wherein the modified lead packet is addressed so that at least one network device receives the modified lead packet after it is forwarded toward the next node and before the next node receives the modified lead packet.

Although the above discussion discloses various exemplary embodiments of the invention, it should be apparent that those skilled in the art can make various modifications that will achieve some of the advantages of the invention without departing from the true scope of the invention.

What is claimed is:

1. A packet routing method for directing packets of a session from an originating node toward a destination node in an IP network, the method comprising:

an initial waypoint node obtaining an original lead packet of a plurality of packets in a session, the initial waypoint node having an initial waypoint node identifier, the original lead packet including header fields including a 5-tuple of information including an original source address, an original source port number, an original destination address, an original destination port number, and an original protocol identifier;

determining if a stateful routing session exists for the session based on the 5-tuple of information in the lead packet and stateful routing session information stored in a database;

when a stateful routing session does not exist for the session, establishing the stateful routing session by:
  (a) storing return association information for the stateful routing session in the database, the return association information based on the 5-tuple of information in the lead packet;
  (b) determining a next node for the session, the next node having a next node identifier;
  (c) assigning a source port number and a destination port number for the session; and
  (d) storing forward association information for the stateful routing session in the database, the forward association information including the next node identifier and the assigned source and destination port numbers;

generating a modified lead packet including the initial waypoint node identifier as the source address, the next node address as the destination address, the assigned session source and destination port numbers, and the original protocol identifier, and including the original source address, the original source port number, the original destination address, and the original destination port number as metadata in the modified lead packet; and forwarding the modified lead packet to the next node though an initial waypoint node electronic output interface to the IP network, the electronic output interface being in communication with the IP network.

2. The packet routing method as defined by claim 1 wherein determining the next node for the session comprises accessing a routing information base having routing information and next node information for the destination node based on the original destination address.

3. The packet routing method as defined by claim 1 further comprising:

the initial waypoint node obtaining a subsequent packet of the plurality of packets in the session;

generating a modified packet based on the forward association information; and forwarding the modified packet toward the next node.

4. The packet routing method as defined by claim 3, wherein the modified packet includes the initial waypoint node identifier as the source address, the next node address as the destination address, the assigned session source and destination port numbers, and the original protocol identifier, and further includes the original source address, the original source port number, the original destination address, and the original destination port number as metadata in the modified packet.

5. The packet routing method as defined by claim 1 further comprising:
the initial waypoint node obtaining a return packet associated with the session;
generating a modified return packet based on the return association information; and
forwarding the modified return packet toward the originating node.

6. The packet routing method as defined by claim 5, wherein the modified return packet includes the original destination address as the source address, the original source address as the destination address, the original source and destination port numbers, and the original protocol identifier.

7. The packet routing method as defined by claim 1 wherein the initial waypoint node comprises a routing device or a switching device.

8. An initial waypoint routing device for directing packets of a session from an originating node toward a destination node in an IP network, the initial waypoint routing device having an initial waypoint node identifier, the routing device comprising:
a plurality of communication interfaces for sending and receiving IP packets over an IP network;
a memory for storing stateful routing session information;
a packet identifier operatively coupled with the plurality of communication interfaces, the packet identifier configured to identify an original lead packet of a plurality of packets in a session received through a first communication interface, the original lead packet including header fields including a 5-tuple of information including an original source address, an original source port number, an original destination address, an original destination port number, and an original protocol identifier;
a session manager configured to determine if a stateful routing session exists for the session based on the 5-tuple of information in the lead packet and stateful routing session information stored in the memory and when a stateful routing session does not exist for the session, establishing the stateful routing session by:
(a) storing return association information for the stateful routing session in the database, the return association information based on the 5-tuple of information in the lead packet;
(b) determining a next node for the session, the next node having a next node identifier;
(c) assigning a source port number and a destination port number for the session; and
(d) storing forward association information for the stateful routing session in the database, the forward association information including the next node identifier and the assigned source and destination port numbers;
a packet modifier configured to generate a modified lead packet including the initial waypoint node identifier as the source address, the next node address as the destination address, the assigned session source and destination port numbers, and the original protocol identifier, and including the original source address, the original source port number, the original destination address, and the original destination port number as metadata in the modified lead packet; and
a router operatively coupled with the packet modifier and with the electronic output interface, the router being configured to forward the modified lead packet toward the destination node through a second communication interface.

9. The initial waypoint routing device as defined by claim 8 further comprising a routing information base having routing information and next node information for the destination node based on the original destination address, wherein the packet modifier is further configured to determine the next node for the session by accessing the routing information base.

10. The initial waypoint routing device as defined by claim 8 wherein:
the packet identifier is further configured to obtain a subsequent packet of the plurality of packets in the session;
the packet modifier is further configured to generate a modified packet based on the forward association information; and
the router is further configured to forward the modified packet toward the destination node.

11. The initial waypoint routing device as defined by claim 10, wherein the modified packet includes the initial waypoint node identifier as the source address, the next node address as the destination address, the assigned session source and destination port numbers, and the original protocol identifier, and further includes the original source address, the original source port number, the original destination address, and the original destination port number as metadata in the modified packet.

12. The initial waypoint routing device as defined by claim 8 wherein:
the packet identifier is further configured to obtain a return packet associated with the session;
the packet modifier is further configured to generate a modified return packet based on the return association information; and
the router is further configured to forward the modified return packet toward the originating node.

13. The initial waypoint routing device as defined by claim 12, wherein the modified return packet includes the original destination address as the source address, the original source address as the destination address, the original source and destination port numbers, and the original protocol identifier.

14. A computer program product comprising a tangible, non-transitory computer readable medium encoded with instructions that when run on a computer system implement a method for directing packets of a session by an initial waypoint node from an originating node toward a destination node in an IP network, the method comprising:
the initial waypoint node obtaining an original lead packet of a plurality of packets in a session, the initial waypoint node having an initial waypoint node identifier, the original lead packet including header fields including a 5-tuple of information including an original source address, an original source port number, an original destination address, an original destination port number, and an original protocol identifier;

determining if a stateful routing session exists for the session based on the 5-tuple of information in the lead packet and stateful routing session information stored in a database;

when a stateful routing session does not exist for the session, establishing the stateful routing session by:
- (a) storing return association information for the stateful routing session in the database, the return association information based on the 5-tuple of information in the lead packet;
- (b) determining a next node for the session, the next node having a next node identifier;
- (c) assigning a source port number and a destination port number for the session; and
- (d) storing forward association information for the stateful routing session in the database, the forward association information including the next node identifier and the assigned source and destination port numbers;

generating a modified lead packet including the initial waypoint node identifier as the source address, the next node address as the destination address, the assigned session source and destination port numbers, and the original protocol identifier, and including the original source address, the original source port number, the original destination address, and the original destination port number as metadata in the modified lead packet; and forwarding the modified lead packet to the next node though an initial waypoint node electronic output interface to the IP network, the electronic output interface being in communication with the IP network.

15. The computer program product as defined by claim 14 wherein determining the next node for the session comprises accessing a routing information base having routing information and next node information for the destination node based on the original destination address.

16. The computer program product as defined by claim 14 wherein the method further comprises:
the initial waypoint node obtaining a subsequent packet of the plurality of packets in the session;
generating a modified packet based on the forward association information; and
forwarding the modified packet.

17. The computer program product as defined by claim 16, wherein the modified packet includes the initial waypoint node identifier as the source address, the next node address as the destination address, the assigned session source and destination port numbers, and the original protocol identifier, and further includes the original source address, the original source port number, the original destination address, and the original destination port number as metadata in the modified packet.

18. The computer program product as defined by claim 14 wherein the method further comprises:
the initial waypoint node obtaining a return packet associated with the session;
generating a modified return packet based on the return association information; and
forwarding the modified return packet.

19. The computer program product as defined by claim 18, wherein the modified return packet includes the original destination address as the source address, the original source address as the destination address, the original source and destination port numbers, and the original protocol identifier.

20. The computer program product as defined by claim 14 wherein the initial waypoint node comprises a routing device or a switching device.

* * * * *